United States Patent [19]

Aoki et al.

[11] Patent Number: 5,777,755
[45] Date of Patent: Jul. 7, 1998

[54] INFORMATION INPUT DEVICE

[75] Inventors: Mikio Aoki; Takashi Nitta, both of Suwa, Japan

[73] Assignee: Seiko Epson Corporation, Tokyo, Japan

[21] Appl. No.: 499,537

[22] Filed: Jul. 7, 1995

[30] Foreign Application Priority Data

Jul. 8, 1994 [JP] Japan .................................. 6-157451

[51] Int. Cl.$^6$ .................................................. H04N 1/024
[52] U.S. Cl. .................. 358/444; 358/473; 358/474; 358/404; 382/312; 382/313
[58] Field of Search ........................ 358/473, 474, 358/442, 404, 444, 468; 382/312, 313, 315; H04N 1/024

[56] References Cited

U.S. PATENT DOCUMENTS

| | | | |
|---|---|---|---|
| 4,731,668 | 3/1988 | Satomura et al. | 358/256 |
| 4,809,351 | 2/1989 | Abramovitz et al. | 382/59 |
| 4,947,261 | 8/1990 | Ishikawa et al. | 358/473 |
| 4,947,345 | 8/1990 | Paradise et al. | 358/442 |
| 4,949,391 | 8/1990 | Faulkerson et al. | 382/56 |
| 5,063,508 | 11/1991 | Yamada et al. | 382/59 |
| 5,532,825 | 7/1996 | Lim et al. | 358/474 |

FOREIGN PATENT DOCUMENTS

| | | | |
|---|---|---|---|
| 56-108175 | 8/1981 | Japan . | |
| 59-8088 | 1/1984 | Japan . | |
| 60-83462 | 5/1985 | Japan | 358/473 |

Primary Examiner—Thomas L. Stoll
Attorney, Agent, or Firm—Mark P. Watson

[57] ABSTRACT

An image-scanning device which includes an image input area possessing an image sensor area that reads images such as characters and graphics on a manuscript illuminated by a light source, transfers the image data corresponding to the read data in a specified size after issuing an image data transfer interrupt request; and an image processing area possessing a ring buffer that stores the image data being sent from the image input area on a specified data size basis in specified areas, and which performs image correction on the image data stored in this ring buffer between image data transfer interrupt requests from the image input area.

36 Claims, 14 Drawing Sheets

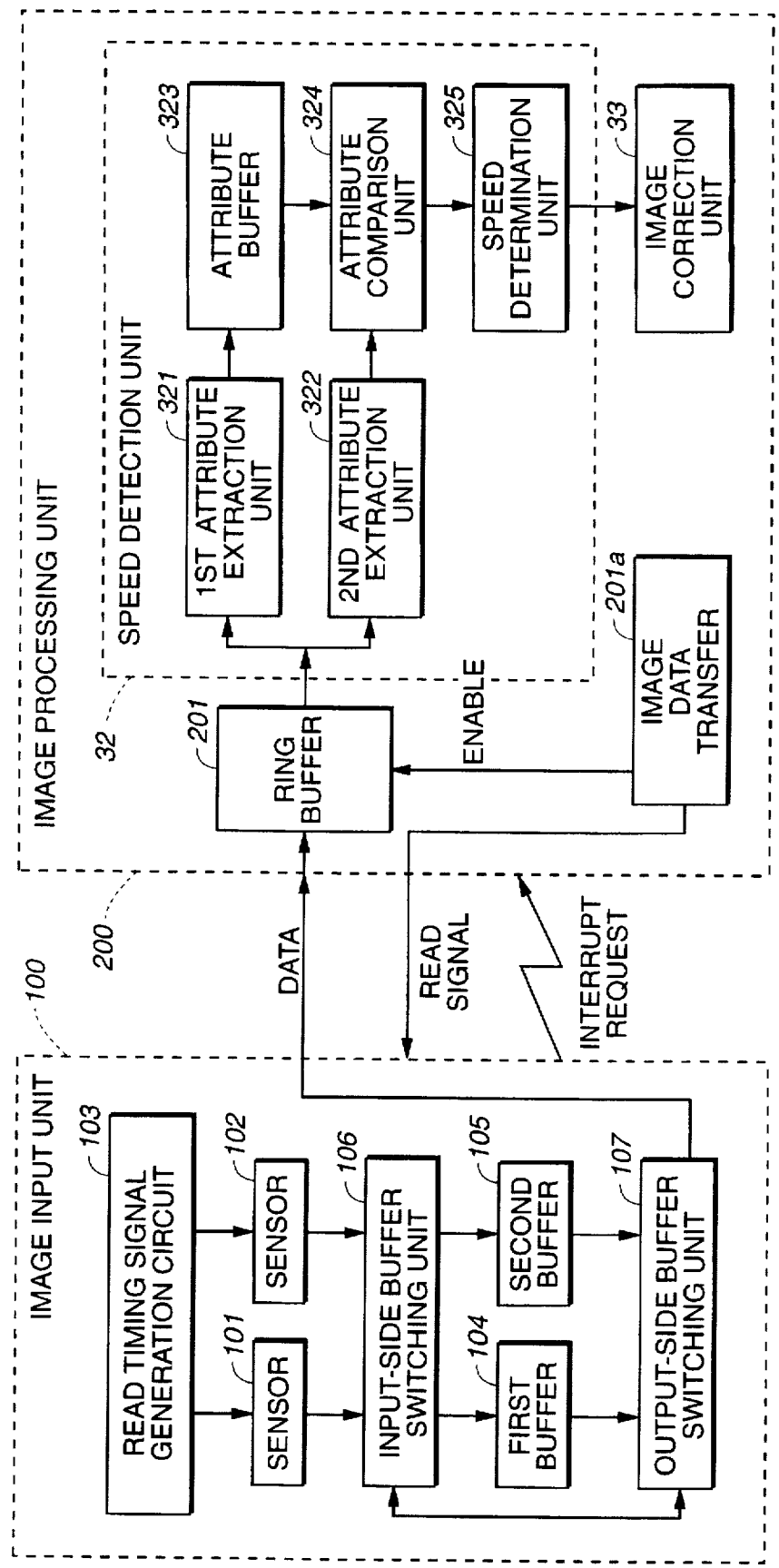
FIG._1A

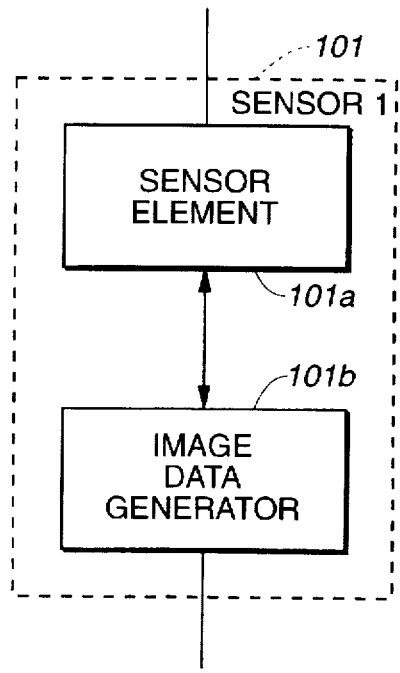
FIG._1B
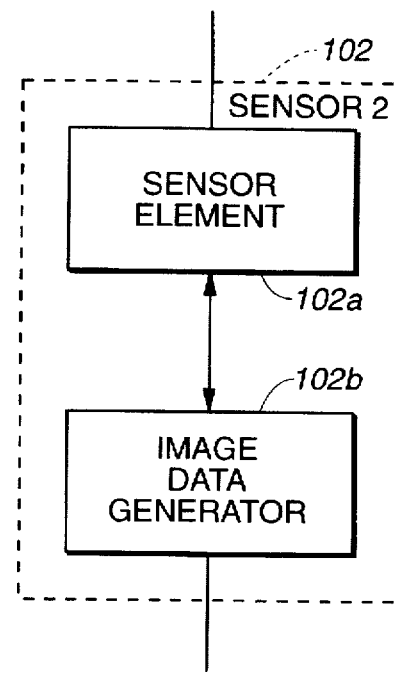
FIG._1C
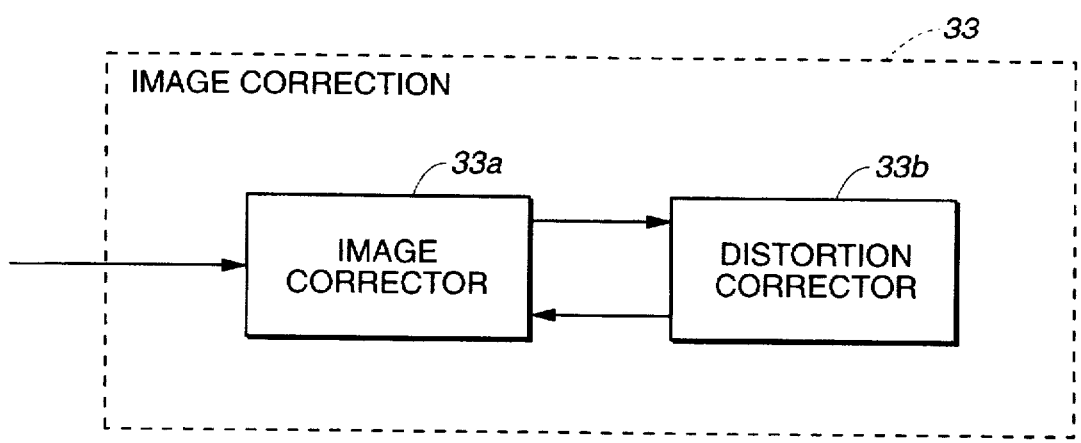
FIG._1D

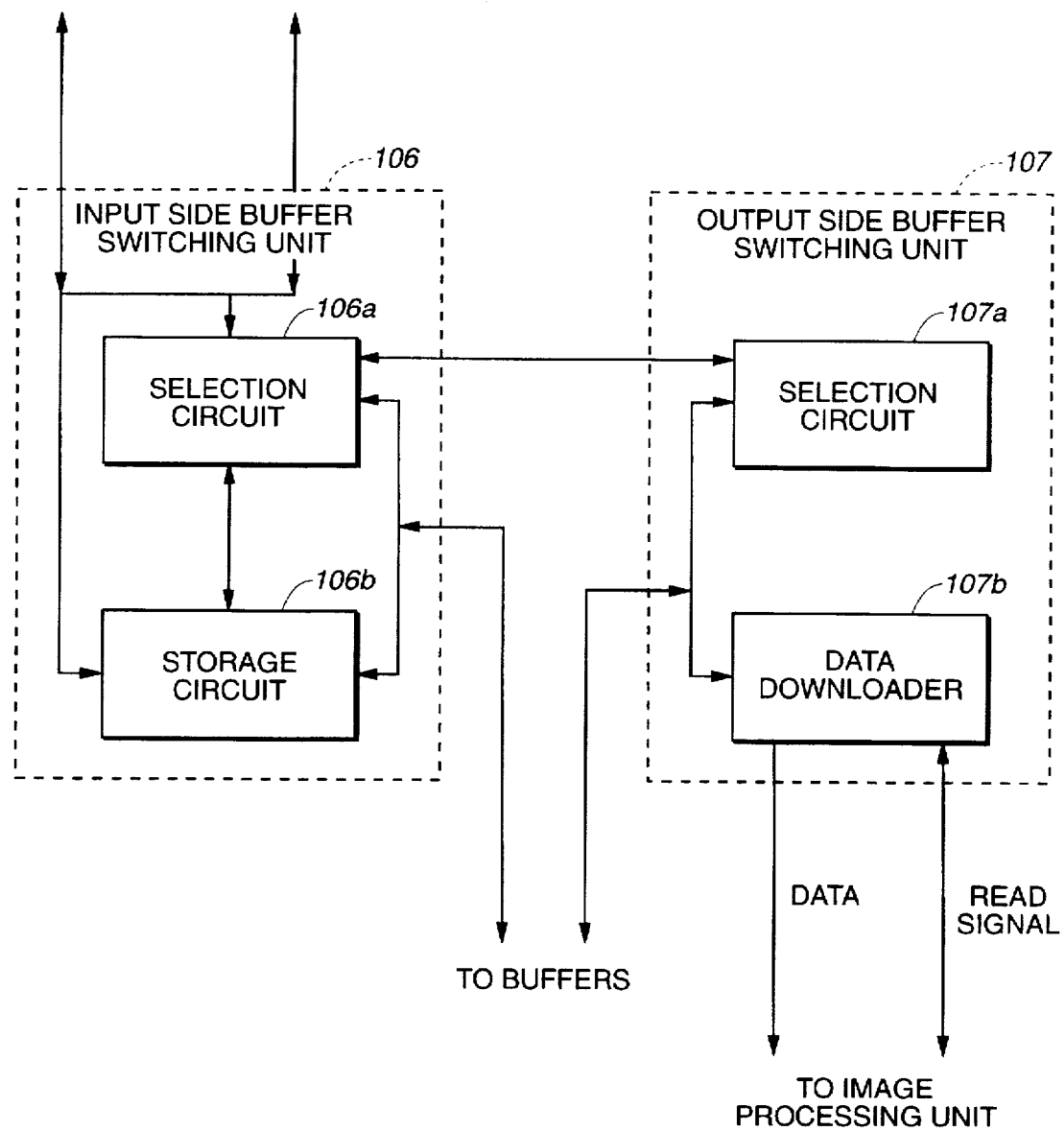
FIG._1E

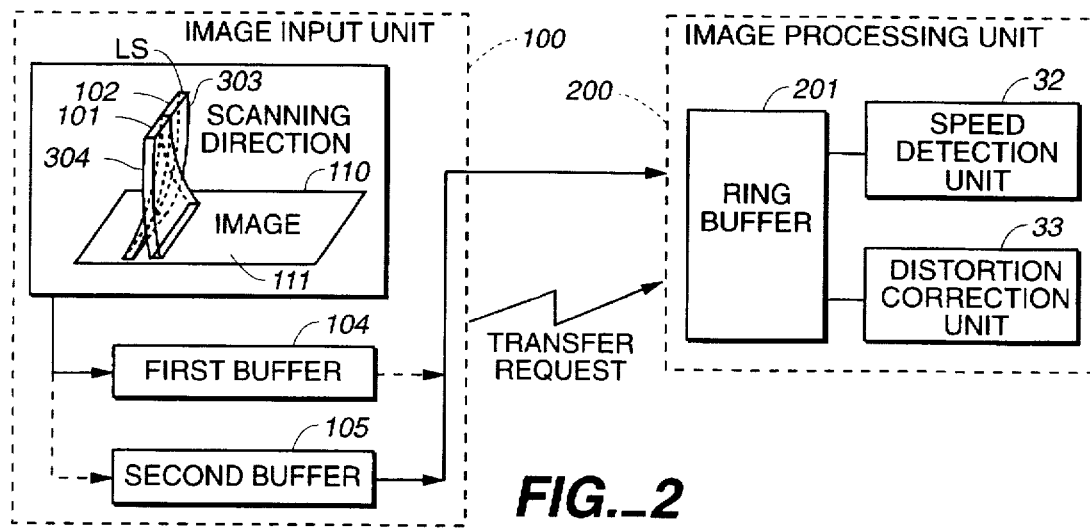
FIG._2
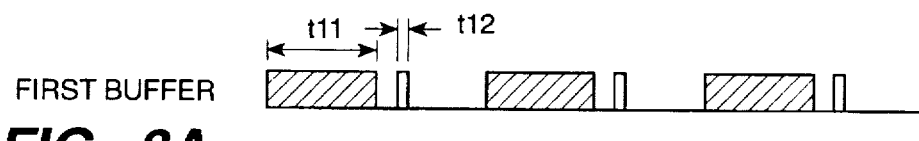
FIG._3A
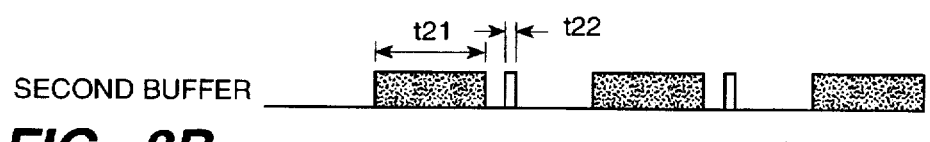
FIG._3B
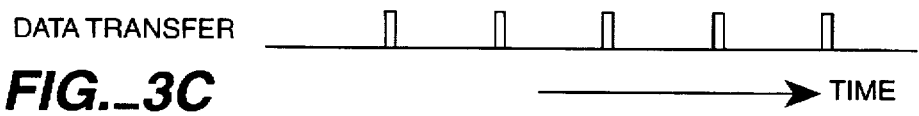
FIG._3C
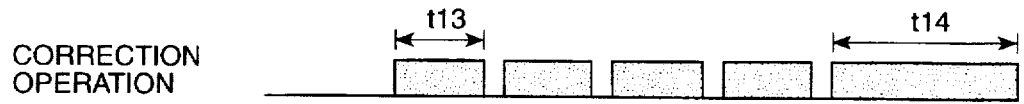
FIG._3D

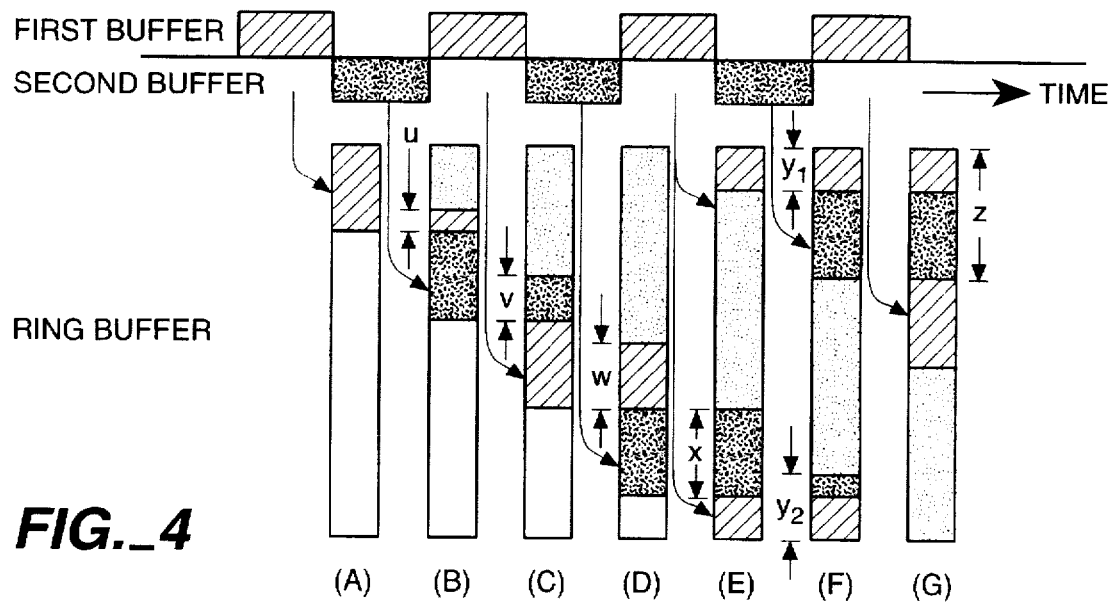
FIG._4
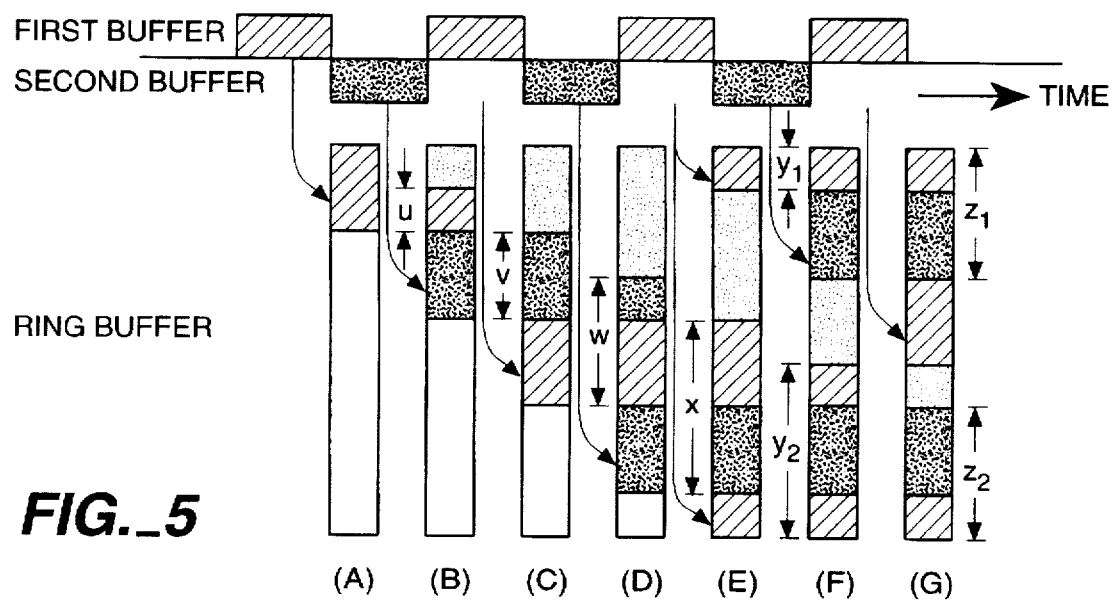
FIG._5

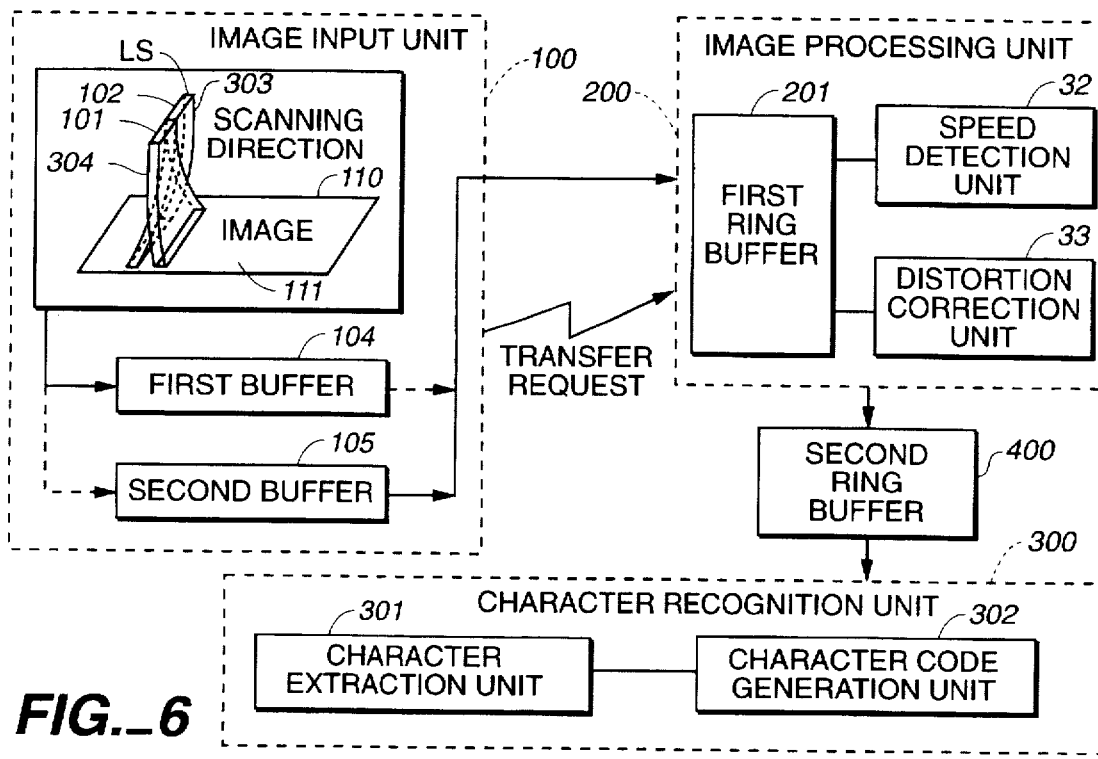
FIG._6
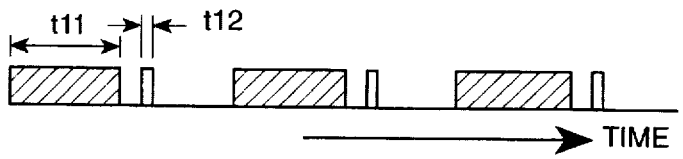
FIG._8A
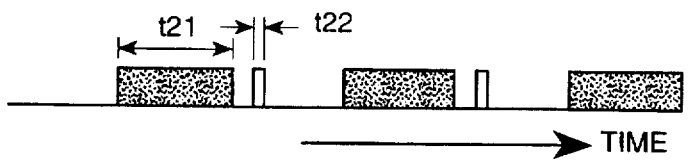
FIG._8B
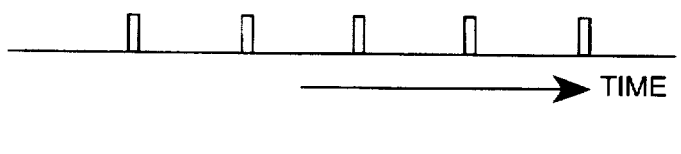
FIG._8C
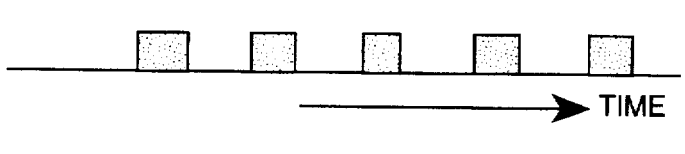
FIG._8D
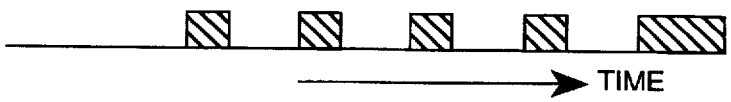
FIG._8E

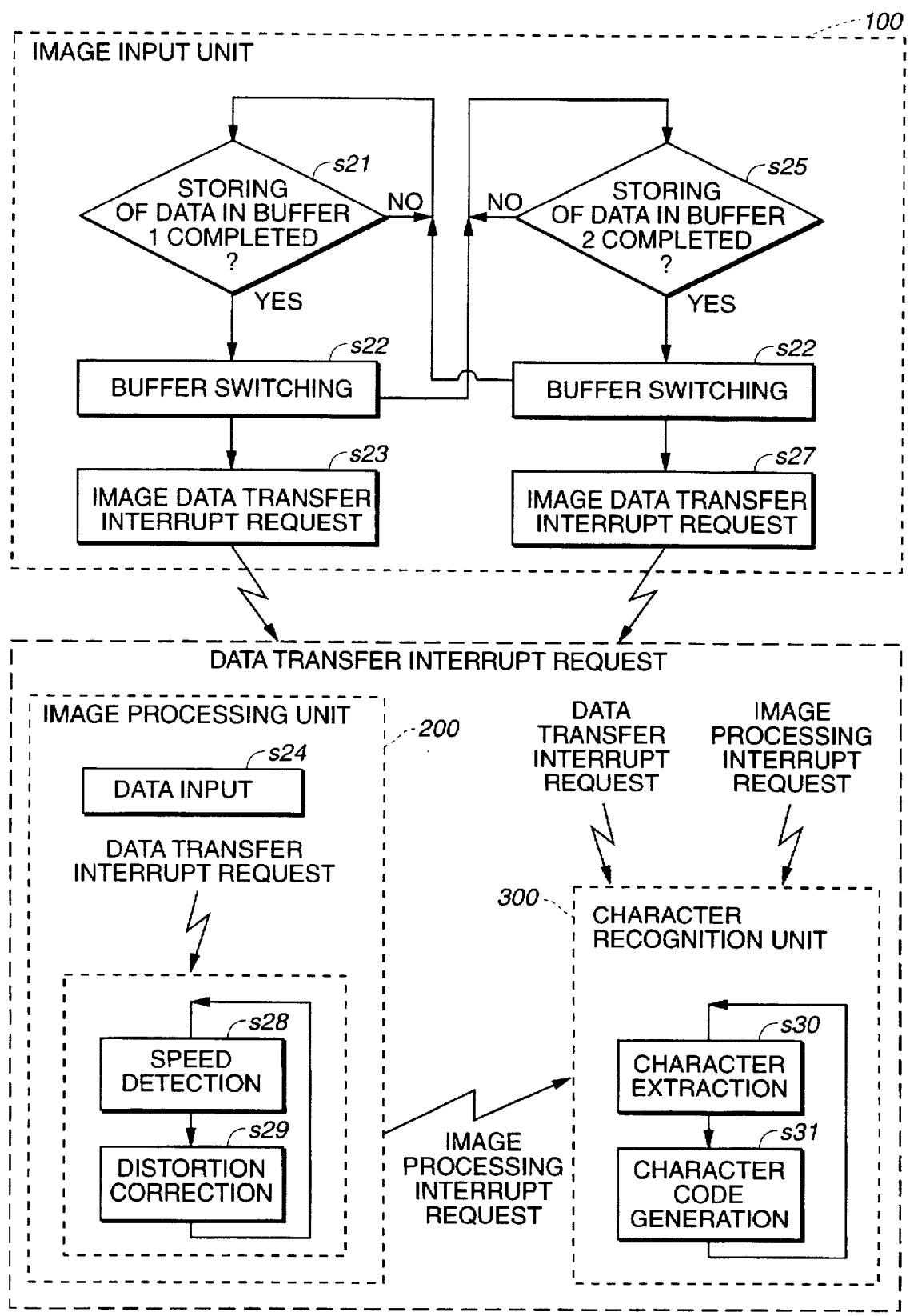
FIG._7

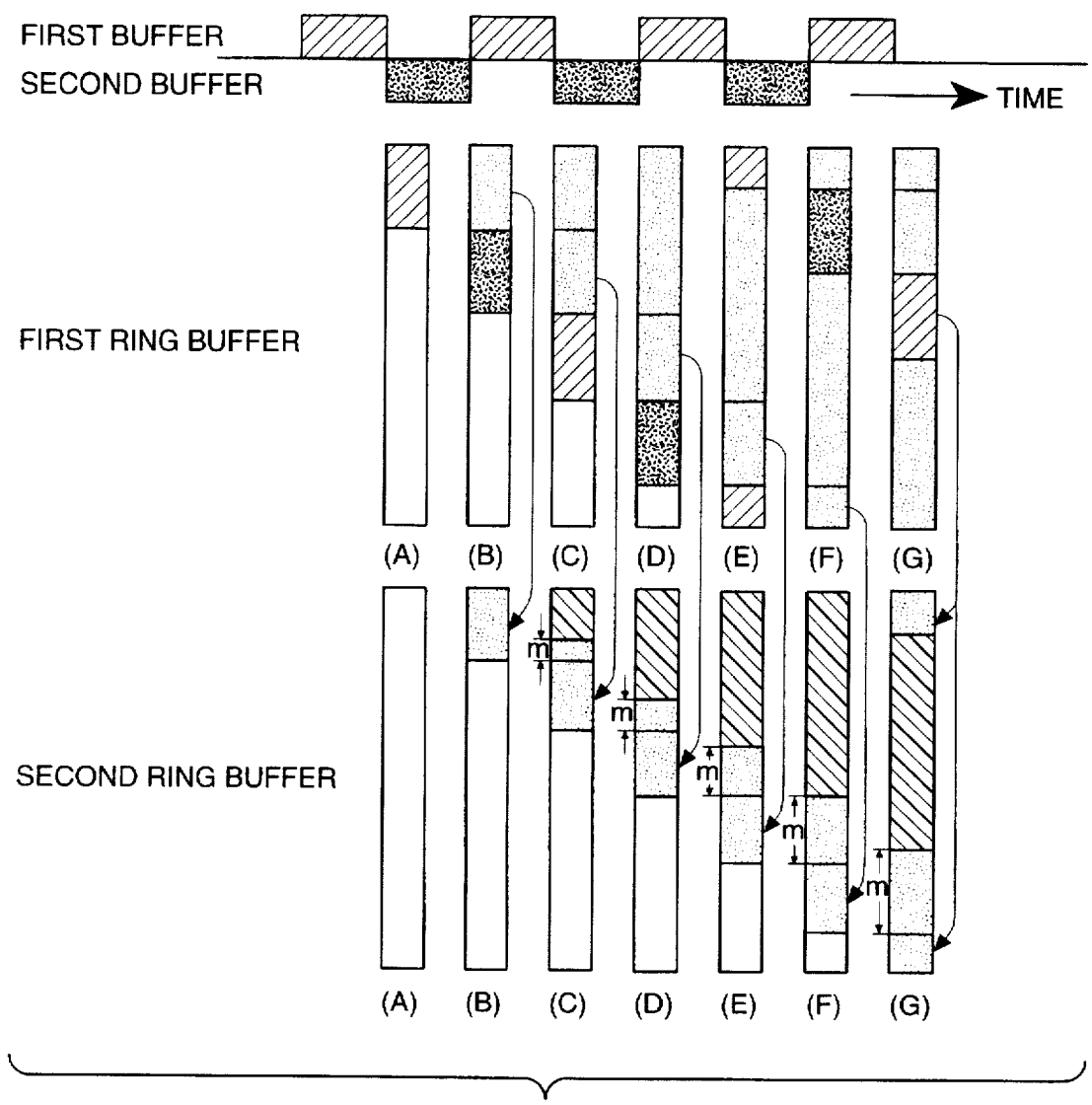
FIG._9

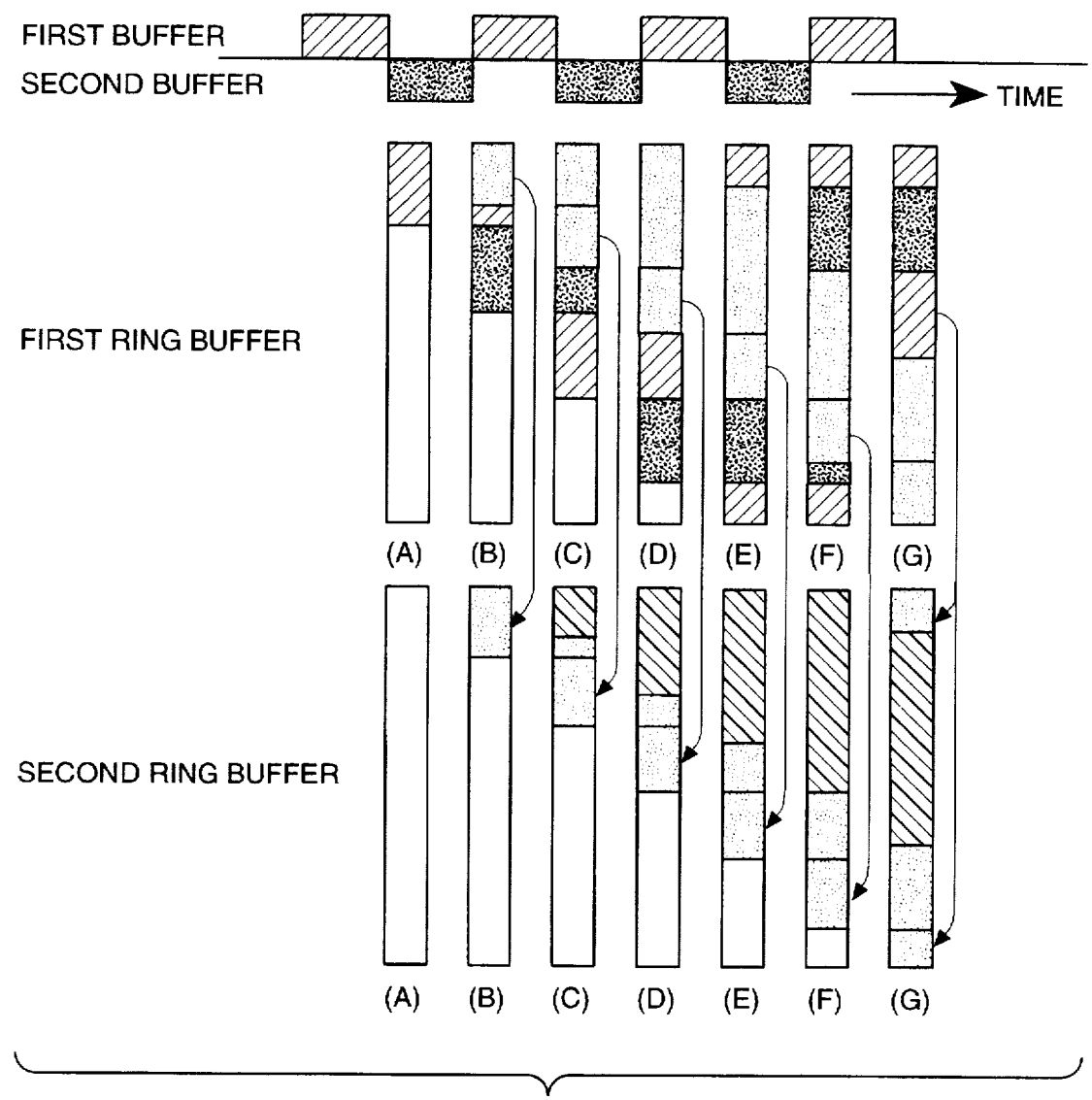
FIG._10

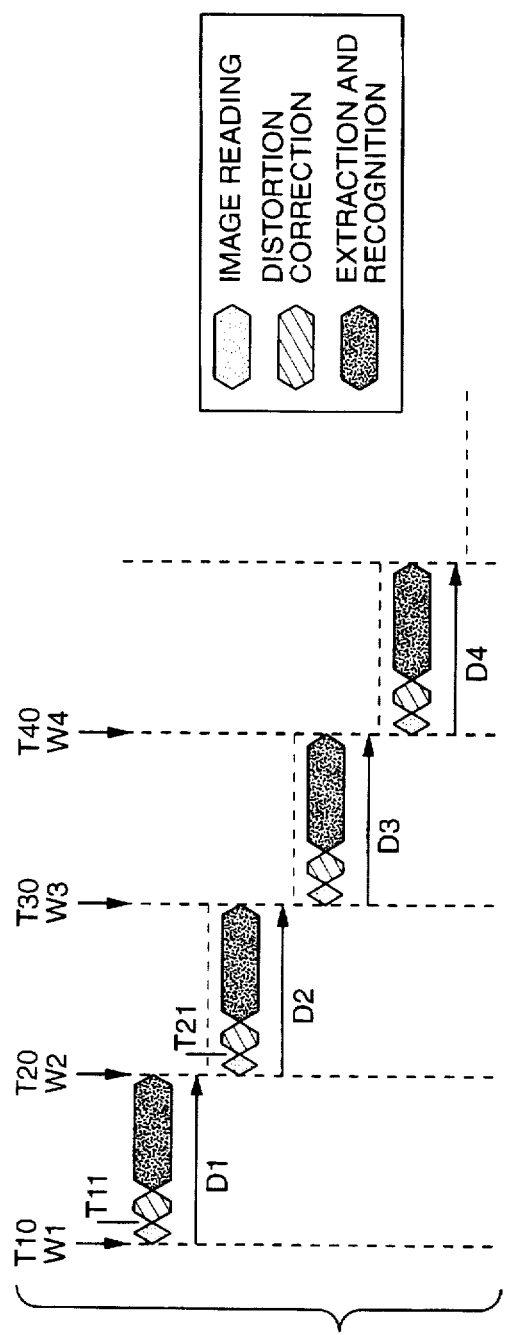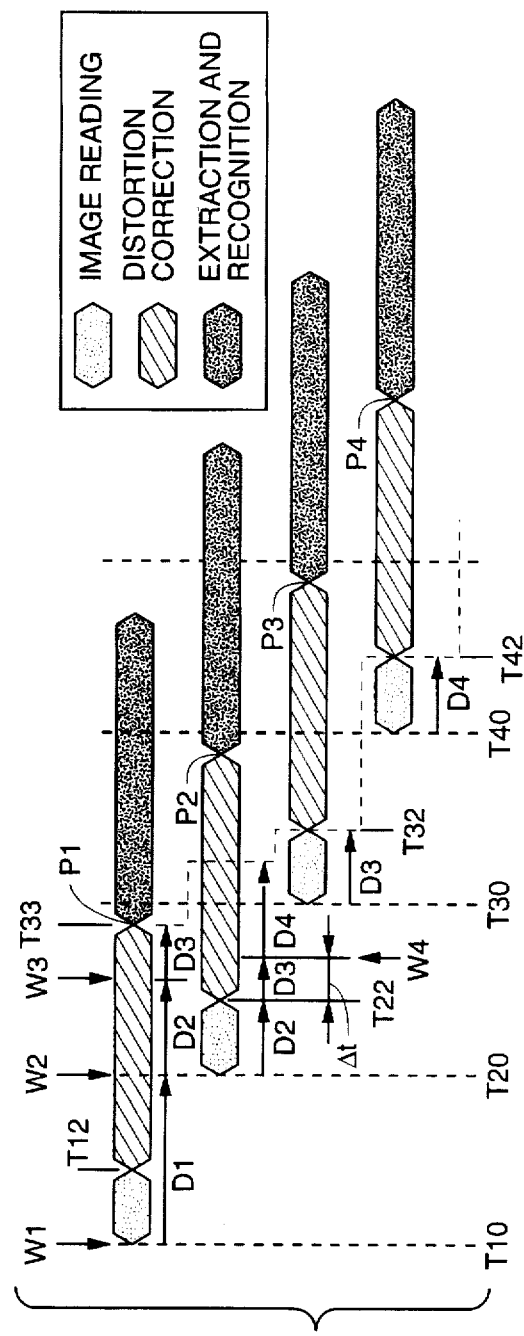
FIG._11A
FIG._11B

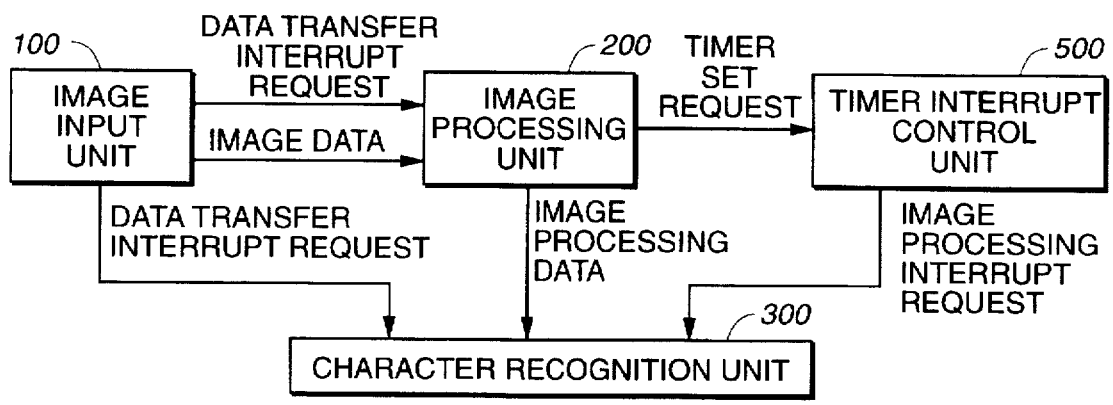
FIG._12
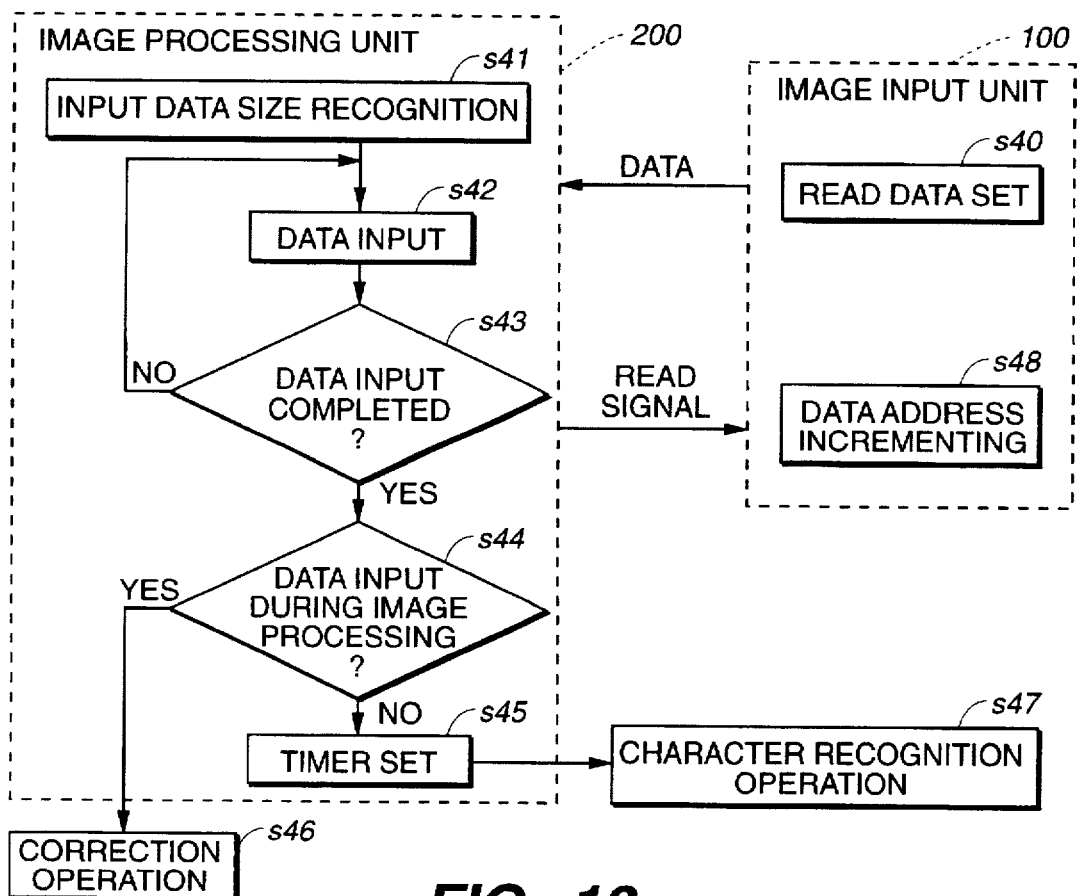
FIG._13

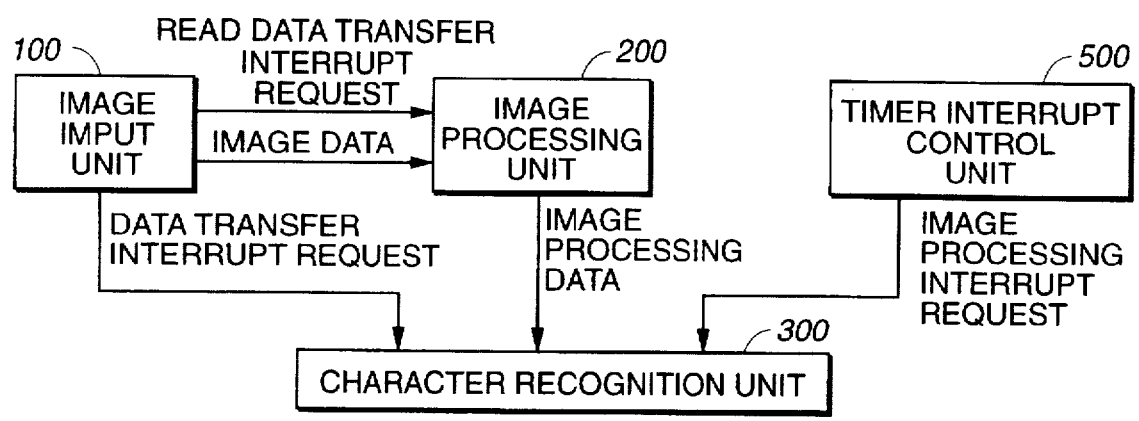
FIG._14
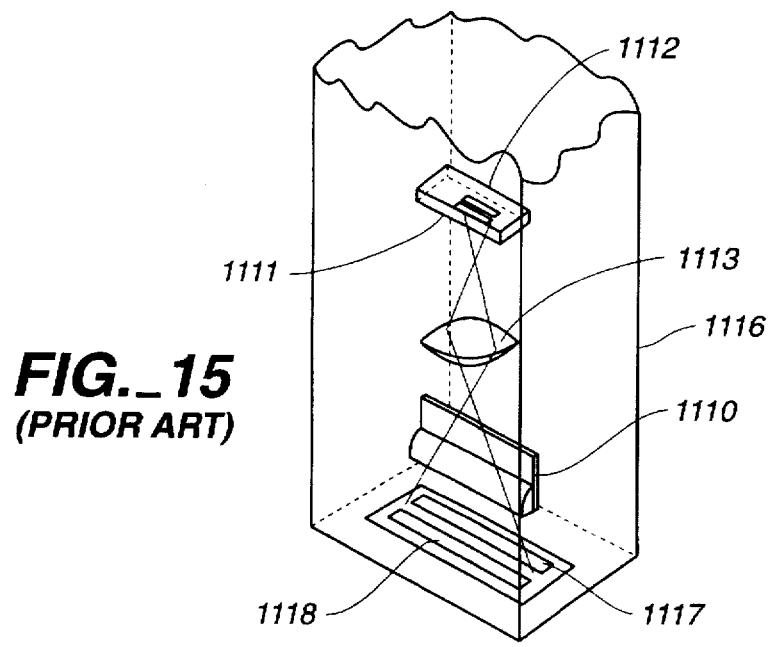
FIG._15
(PRIOR ART)

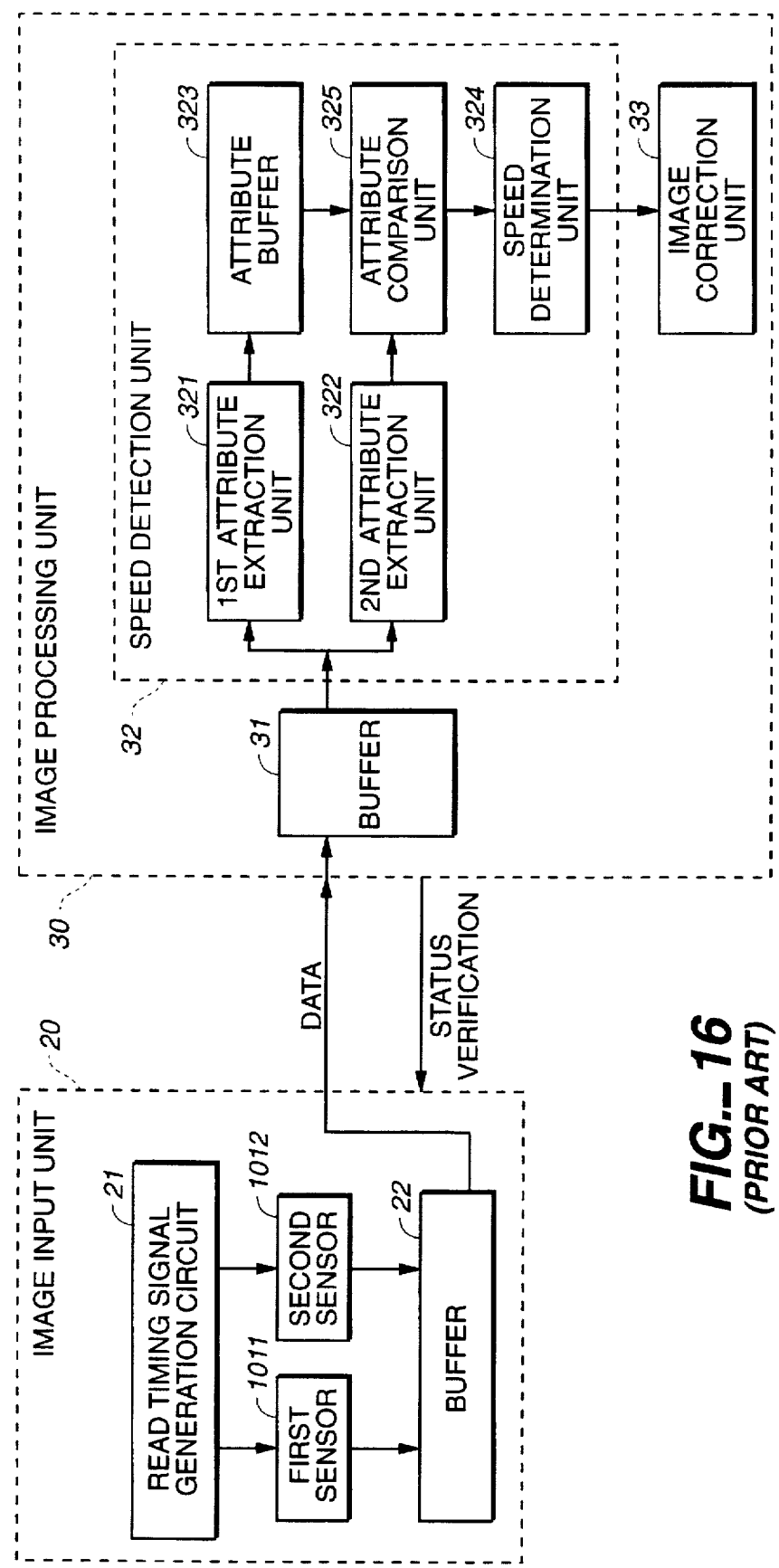
FIG._16
(PRIOR ART)

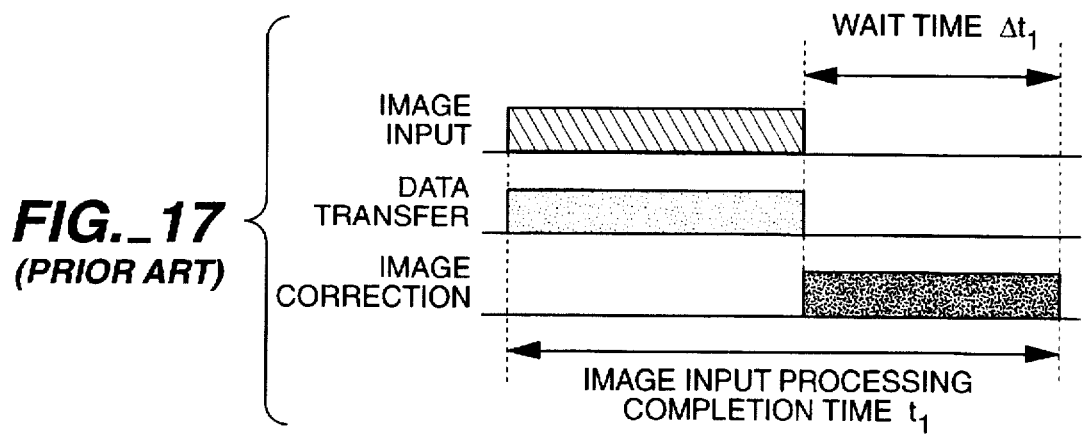
FIG._17
*(PRIOR ART)*
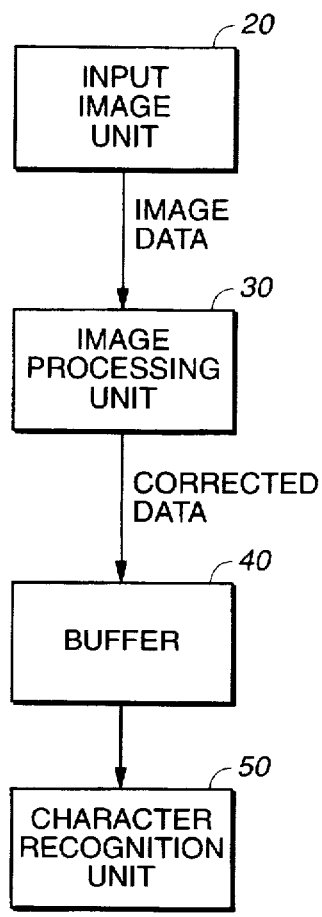
FIG._18
*(PRIOR ART)*
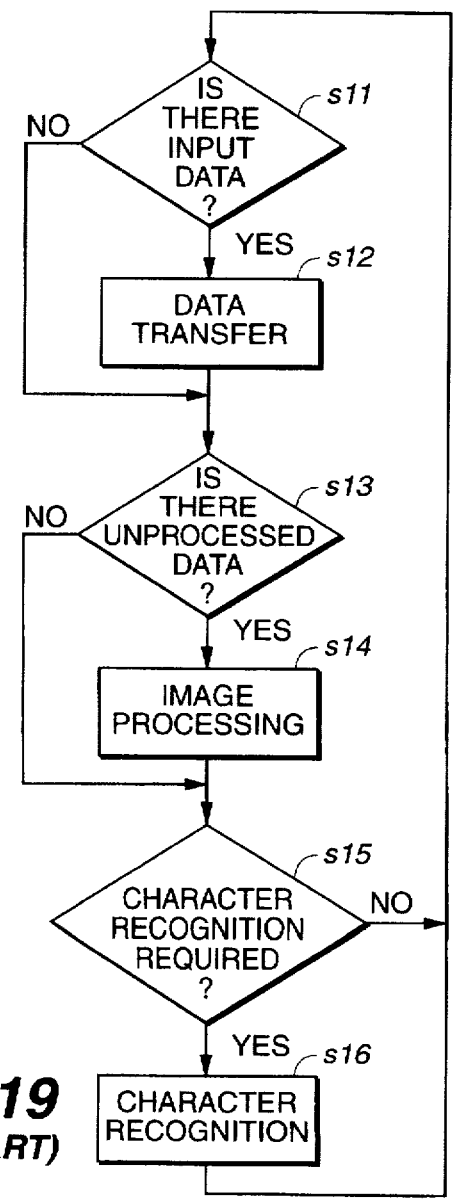
FIG._19
*(PRIOR ART)*

INFORMATION INPUT DEVICE

BACKGROUND OF THE INVENTION

1. Field of the Invention

This invention relates to an information input device and method that scans in character and graphical-based information contained in printed form and converts this information into computer-readable image data or character codes.

2. Description of the Related Art

The microcomputer revolution of the past decade has brought about universal access to processing power and computing options once reserved exclusively for expensive mainframe architectures. And, as personal computer development advances at an ever increasing pace, so too does the variety and adaptation of their use in the marketplace. This has spurred a rapid introduction of intelligent, microcontroller-driven consumer products mentioned only in science fiction novels just a few years before.

One of the most active trends in contemporary computing has been in the field of document processing, and more particularly, converting printed information into electronic form. Peripheral devices known as "handheld scanners" have been developed to automate this conversion process. A conventional handheld scanner reads optical images by touching the roller installed on its tip to images such as characters and rolling over them. The optical signal obtained is converted to an electrical signal through photoelectrical conversion, and is then processed by an image processor in order to provide computer-readable character codes or image data. In this roller-type scanner, distance is calculated based on the rotation of the roller. For example, 16 pieces of image data may be read for every 1 mm of movement, and the obtained image data are then processed by an image processing means. Consequently, the roller must be firmly contacting the image while it is moved. If this condition is met, it becomes possible to read ideal image data regardless of the movement speed (hereinafter referred to as "scanning speed").

However, as explained above, it is not always easy for the operator to maintain firm contact with the image while moving the roller; in some cases the roller might be moved while it is not in contact with the image. Since the roller does not rotate if it is not in contact with the image while being moved, distance cannot be determined. Consequently, an accurate image that corresponds to the scanning speed cannot be read. Furthermore, this type of image input means requires an encoder unit that outputs a pulse signal that matches the distance moved based on the roller movement or roller rotation, thus increasing the overall frame size of the apparatus. For example, for small-size scanners such as pen-type scanners, the area that actually reads images is only around 10 mm wide. However, the area that contacts the manuscript ends up being at least 30 mm wide because of the encoder. Additionally, frequent use of the scanner may cause wear or damage in the moving area (roller area), rendering the scanner unfit for long-term use.

Accordingly, a handheld scanner shown in prior art FIG. 15 has been developed to remedy the problems inherent in roller-type handheld scanners. As shown in this figure, this scanner possesses two line sensors 1011 and 1012 utilized as one-dimensional image sensors (hereafter referred to as "the first sensor 1011" and "the second sensor 1012"). It also possesses two light passage holes 1117 and 1118 which are spaced a specified distance apart. The light from LED1 1010 passes through the two light passage holes 1117 and 1118 and illuminates the characters, etc. on the page being scanned. The reflected light is intercepted by the first sensor 1011 and the second sensor 1012 via optical system 1013.

Image processing by the scanner illustrated in prior art FIG. 15 will be described in more detail in reference to prior art FIG. 16. Prior art FIG. 16 is a block diagram of the configurations of the image input area and the image processing area, and is used for explaining image data processing. As such, the figure, shows only those configuration elements that are necessary for explaining image data processing. In FIG. 16, 20 is a scanner (image input unit); the first sensor 1011 and the second sensor 1012 read characters in different positions based on the timing signals issued by read timing signal generation circuit 21, and temporarily stores the data in buffer 22.

On the right side of FIG. 16, image processing unit 30 comprises buffer 31, speed detection unit 32, and image correction unit 33. This speed detection unit 32 comprises the first attribute extraction unit 321, the second attribute extraction unit 322, attribute buffer 323, attribute comparison unit 324, and speed determination unit 325. This image processing area 30 is typically installed inside an information processing device, such as a personal computer (not shown). Note that buffer 31 installed inside this image processing area 30 is extremely large, allowing it to store all the image data that will be sent from image input area 20 during a scan operation.

In this configuration, the first sensor 1011 and the second sensor 1012 in image input unit 20 read characters in different positions based on the timing signals issued by read timing signal generation circuit 21. The image data that is read is first temporarily stored in the buffer 22, and is then sent to image processing unit 30 and stored in buffer 31. In this way, while image input unit 20 is scanning data, all of the image data read by the first sensor 1011 and the second sensor 1012 is stored in buffer 31 of image processing unit 30.

When scanning is completed, image data is extracted from buffer 31. After the scanning speed of image input unit 20 is determined by speed detection unit 32, the distortion in the image data is corrected by image correction unit 33 based on the scanning speed. In other words, in speed detection unit 32, the first attribute extraction unit 321 extracts the attributes of the image data generated by the first sensor 101 at a certain point in time; the attribute data is then stored in attribute buffer 323; and then the attributes of the image data from the second sensor 102 extracted by the second attribute extraction unit 322 is compared with the attribute data in the above-mentioned attribute buffer 323 by attribute comparison unit 324, in order to determine whether there is a match. If the two pieces of image data match each other, that unit the second sensor 1012 has reached the read-out position of the first sensor 1011. Speed determination unit 325 then determines the scanning speed based on the elapsed time. Based on this scanning speed, the distortion in the image data is corrected by image correction unit 33.

By adopting such a method, the image distortion caused by changes in scanner speed is corrected, and distortion-free image can be obtained. Furthermore, this method provides various advantages over roller-type scanners. For example, the absence of an encoder unit makes the scanner smaller; the scanner tip need not contact the material to be read, resulting in improved operability; and the absence of a moving unit such as a roller results in increased durability.

However, as explained above, a conventional dual line sensor image input device requires a distortion correction process that is based on speed detection. In order to perform this process, an extremely large buffer (buffer 31 in FIG. 16, for example) is usually installed in the image processing unit, and speed detection and image correction are performed after all of the image data has been sent into this buffer.

Prior art FIG. 17 illustrates a timing diagram that shows the image data input processing operation of a manual image input device using the above-described conventional dual line sensor. FIG. 17 shows the image input operation performed by image input unit 20; shows the data transfer operation from image input unit 20 to image processing unit 30; and shows the image correction operation (distortion correction, including speed detection) performed by image processing unit 30.

As evident from this figure, in the conventional dual line sensor image input device, an image is input by image input unit 20 and the image data is then transferred to image processing unit 30 which performs image correction operations such as speed detection and distortion correction. Consequently, an extremely long period of time (t1: image input processing completion time) is required between the start of image data reading by image input unit 20 and the completion of image correction by image processing unit 30. Furthermore, the difference Δt1: wait time) between this image input processing completion time (t1) and the image input time of image input unit 20, becomes proportionally longer as the image input time of image input unit 20 increases. This results in extremely poor image input efficiency, especially when high-speed computers are used for image processing tasks.

Additionally, in the conventional method, buffer 31 which stores the image data sent from image input unit 20 must be extremely large since it must store all of the image data. Furthermore, because the amount of image data that can be stored in the buffer is finite, it is not possible to fully utilize the processing capability of the personal computer to which the image input device is connected. That is, once the image processing buffer 31 is filled, transfer of image data from the input unit 20 stops. Image correction is then performed on all of the image data present in the image processing buffer 31. When processing is complete, the image processing buffer 31 is flushed so more image data can be processed and scanning operations resume. Consequently, the sequentially-performed large buffer fill, full buffer image processing, buffer flush and buffer refill steps constitute an inflexible data bottleneck, which makes it difficult to optimize throughput and task handling for differently-configured computer serving as host for image processing tasks.

A similar problem occurs in scanners in which a character recognition area is connected to the above-mentioned image input unit 20 and image processing area 30.

Prior art FIG. 18 shows a simplified configuration of such a conventional scanner, where 20 refers to the image input unit, and 30 relates to the image processing unit. Their explanations are omitted since they are identical to those shown in prior art FIG. 16. In this FIG. 40 refers to the buffer which stores image data on which image correction processing, such as distortion correction, has been performed by image processing unit 30; and 50 is the character recognition unit which extracts the processed image data stored in the buffer, performs character recognition, and then outputs character codes that correspond to those characters. Although not shown in the figure, character recognition unit 50 is equipped with a character extraction unit and a character generation unit.

In this type of configuration of the conventional image input device, an image is input by image input unit 20, and the image data is then transferred to image processing unit 30, which performs image correction operations such as speed detection and distortion correction. Using this corrected image data, character recognition unit 50 performs character recognition. In this way, the next processing takes place only after the prior process has been completed. Consequently, an extremely long period of time (information input processing completion time) is required between the start of image data reading by image input unit 20 and the completion of character recognition by character recognition unit 50. Furthermore, the difference (wait time) between this information input processing completion time and the image input time of image input unit 20 becomes proportionally longer as the image input time of image input unit 20 increases, resulting in extremely poor information input efficiency.

Additionally, in such a method, buffer 40 shown in prior art FIG. 18 must be extremely large since it must store all of the corrected image data downloaded during a particular scan event.

By contrast, other methods are available, such as that shown in prior art FIG. 19, in which all of the processing is performed on an as-needed basis. As evident from the figure, this method performs processing in the following polled time series approach. First, any data to be transferred is transferred to image processing unit 20 (steps s11 and s12). Next, any image data waiting to be corrected is corrected (steps s13 and s14). Finally, any data ready to be character-recognized is character-recognized (steps s15 and s16).

However, in this technique, image data transfer, image correction, and character recognition must all be completed before the next image data transfer request can be serviced. Thus, if the processing speed of the personal computer is slow, the next image data transfer request might be received while image correction is still taking place. In this case, image processing unit 20 will miss the timing for image data input. To prevent such a problem, it is necessary to design all image processing routines to match the slowest supported personal computer. However, doing so will result in much wasted wait time for high-speed personal computers, lowering processing efficiency, and preventing optimal utilization of the full processing capability of the personal computer.

It is, therefore, an object of the present invention to provide an information input device and information input method that efficiently process image data that has been read by optimally utilizing the processing capability of the personal computer used.

SUMMARY OF THE INVENTION

In order to achieve the above and other related objects, the present invention is directed to an information input device or scanner that reads image data such as characters and graphics through scanning, and corrects and outputs the image data that has been read. The invention generally comprises an image sensor unit that reads images such as characters and graphics on an input document illuminated by a light source, an image input unit that transfers the image data corresponding to the read data in a specified size after issuing an image data transfer interrupt request, a ring buffer that stores the image data being sent from the image input unit on a specified data size basis in specified units, and an image processing unit that performs image correction on the image data stored in this ring buffer in the time interval between image data transfer interrupt requests from the image input area.

Additionally, the image input unit of the present invention preferably possesses a plurality of parallel buffers to store image data sent from the image sensor unit on a specified data size basis. Input/output switching will be employed to manage data flow in a manner which maximizes throughput to the image processing area while preventing overrun errors or loss of scanned image data. Also, the switching circuitry is may also be responsible for notifying the image processing unit, including the aforementioned ring buffer, that at least one of the input buffers is full and ready for downloading its image data to the ring buffer.

However input buffering notification is implemented, it preferably takes the form of a hardware-based interrupt issued by the image input unit to the image correction unit when one of the input buffers is filled beyond a preselected threshold level of fullness. Further, preferably, once this image data transfer request interrupt has been issued, it should always be immediately serviced by the image processing unit regardless of the tasks it is presently servicing (these tasks will preferably be suspended). Once downloading has completed, the image processing unit preferably resumes its previous tasks at the point of suspension.

Also, when character recognition functions are desired, a scanner according to the present invention will preferably include a character generation unit having a second ring buffer to store corrected but yet unrecognized image data produced by the image correction unit. Further, this image correction unit will preferably have the necessary circuitry to notify the character recognition unit when corrected image data is available for character recognition post-processing. More specifically, the image correction unit can generate a second data transfer interrupt when necessary to fill a portion of the second ring buffer with corrected but unrecognized image data.

Further, preferably, a priority scheme will be preferably realized in the PC hosting the aforementioned image correction and character recognition activities, such that image data transfer (from the image input unit to the first ring buffer) is assigned the highest priority, general image correction operations are assigned the next highest priority, and character recognition the lowest priority in relation thereto. This unit that transferring raw image data from the image input buffers to the first ring buffer will preempt all other scanning activities in progress or awaiting execution. The image correction unit will next process any outstanding image correction functions until the next data transfer request is received. Character recognition will preferably be performed only when no image correction and image data transfer activities are needed.

As described with reference to the second preferred embodiment, this priority scheme maximizes potential throughput by assigning the highest priority to the least time-intensive but most critical step to maintain a steady data flow from the image sensing and input unit to the personal computer hosting image correction and character recognition activities. Likewise, image correction will preempt character recognition activities since it is typically less time intensive for the anticipated image data input than character recognition but is still more critical to the scanning process. Finally, character recognition activities can still be serviced in almost all situations and PC host configurations because of the typically long time delays between scanning operations attributed to selection, manipulation and realignment activities. This is especially true when using a hand-held device for sensing the images as is outlined in the preferred embodiments.

The above-described scanning configurations and techniques according to the present invention make it possible to optimally utilize the processing capability of the personal computer used, in processing the image data that has been read. That is, by using a ring buffer for the image data storage buffer in the image processing unit, and by having the image processing area correct the image data in the ring buffer while the image input unit is receiving image data, the free memory unit inside the ring buffer can be used repeatedly, improving the hardware utilization rate and enabling image correction at a speed nearly matches the processing speed of the personal computer used. Therefore, which it will not be necessary to design all process programs to match the slowest personal computer. As a result, high-speed personal computers can process a large volume of image data while low-speed personal computers can process image data at appropriate speeds.

Furthermore, in an information input device or scanner which employs a character recognition unit connected to the image input area and the image processing unit to extract characters using the image data that has been corrected by the image processing unit and generate character codes that match the extracted characters, the scanner according to the present invention can preferable include a second ring buffer for the image data storage buffer in the image processing unit. In this case, the image processing unit corrects the image data contained in the first ring buffer while the image input unit is receiving image data, as described above. By using the second ring buffer for storing the image data that has been corrected by the image processing unit, both the image processing unit and the image input unit can repeatedly use the free memory units contained in the first and second ring buffers, thereby improving the hardware utilization rate and enabling image correction at a speed that matches the processing speed of the personal computer used. Moreover, prioritizing the image correction and character recognition tasks according to their respective influence on the data bottleneck as well as their required servicing time will supplement these potential performance gains. Therefore, it will not be necessary to design all process tasks to match the slowest personal computer, as in required in the prior art. Moreover, high-speed personal computer hosts can process a large volume of image data and recognize a large number of characters while low-speed personal computers can process image data and recognize characters at appropriate speeds.

BRIEF DESCRIPTION OF THE DRAWINGS

A better understanding of the present invention may be had in reference to following preferred embodiments when considered in conjunction with the following drawings, in which:

FIGS. 1A–1E collectively depict overall configuration diagram depicting the first preferred embodiment of the invention;

FIG. 2 is a configuration diagram showing the image input unit (image sensor unit) used in first preferred embodiment;

FIGS. 3A–3D depict a timing diagram showing the reading and transfer of image data based on buffer switching in the first preferred embodiment;

FIG. 4 illustrates the operation of the ring buffer according to the first preferred embodiment when utilizing a high-speed personal computer;

FIG. 5 illustrates the operation of the ring buffer according to the first preferred embodiment when utilizing a low-speed personal computer;

FIG. 6 is an overall configuration diagram showing a second preferred embodiment of the invention;

FIG. 7 is a flow chart showing an overview of all processing steps used in the second preferred embodiment;

FIGS. 8A–8E depict a timing diagram showing an example of the overall operation of the second preferred embodiment;

FIG. 9 illustrates the operation of the first and the second ring buffers in the second preferred embodiment when using a high-speed personal computer;

FIG. 10 depicts the operation of the first and the second ring buffers in the second preferred embodiment when using a low-speed personal computer;

FIGS. 11A an 11B are a timing diagrams showing image correction and character recognition operations when using high-speed and low-speed personal computers respectively, according to the second preferred embodiment;

FIG. 12 refers to a block diagram showing the image data transfer interrupt request and the image correction interrupt request according to the second preferred embodiment;

FIG. 13 is a flow chart showing the operation of the second preferred embodiment as depicted in FIG. 12;

FIG. 14 is a block diagram showing another example of the image correction interrupt request shown in FIG. 12;

FIG. 15 is a prior art configuration diagram showing the image input unit of a conventional dual-sensor method;

FIG. 16 is a prior art configuration diagram showing an information input device based on a conventional dual-sensor method;

FIG. 17 is a prior art timing diagram showing the processing operation in a conventional dual-sensor method;

FIG. 18 is a prior art configuration diagram showing an overview of a wellknown scanner that consists of a conventional image input unit, image processing unit, and character recognition unit; and FIG. 19 depicts a prior art flow chart showing an example of conventional data processing by the scanner shown in FIG. 18.

DETAILED DESCRIPTION OF THE EMBODIMENTS

FIG. 1A shows the configuration of the presently preferred embodiment of the invention. In this figure, 100 is an image input unit or scanner which basically consists of two sensors 101 and 102 which extract image data in the same location at different times during an image reading operation in the scanning direction (a specific example of this method of extracting image data in the same location at different times will be explained below); read timing signal generator 103 which provides read timing signals to the sensors 101 and 102; first and second buffers 104 and 105 which store the image data from the two sensors; input-side buffer switching unit 106 which selects one of the buffers for storing the image data from the two sensors; and output-side buffer switching unit 107 which extracts image data from one of the two buffers, in which a specified amount of image data has been stored, and transfers it to image processing unit 200 (to be explained below).

The input-side buffer switching unit 106 may initially select the first buffer 104 as a default upon system initialization. In this case, the image data from the two sensors 101 and 102 is stored in the first buffer 104, and when a specified amount of image data has been stored in this buffer, the second buffer 105 will be selected and the image data from the two sensors 101 and 102 will be stored in the second buffer 105. When a specified amount of image data has been stored in the second buffer, the first buffer 104 will be selected and the image data from the two sensors 101 and 102 will be stored in the first buffer 104. Switching continues repeatedly in this way.

When a specified amount of image data has been stored in the first buffer 104, for example, and image data storage operation switches to the second buffer 105, the output-side buffer switching unit 107 selects the first buffer 104 at a specified timing, extracts the image data stored in the first buffer 104, and sends it to image processing unit 200. Note that an interrupt request for image data transfer is issued in a known manner from image input unit 100 to image processing unit 200 for this operation.

It should be recognized here, that, even though only two input buffers are used in the present embodiment, the invention is not so limited. Indeed, an ordinary skill could use any number of input buffers as long as the herein described switching and transfer notification techniques are implemented therein.

On the other hand, the image processing unit 200 basically consists of ring buffer 201 which stores the image data sent from image input unit 100 (the operation of this ring buffer 201 will be explained below), speed detection unit 32, image correction unit 33, etc. The speed detection unit 32 and image correction unit 33 are assigned the same numbers as speed detection unit 32 and image correction unit 33 in FIG. 16, used for the explanation of a conventional example, as they essentially are identical. Furthermore, the first attribute extraction unit 321, the second attribute extraction unit 322, attribute buffer 323, attribute comparison unit 324, and speed determination unit 325 are also assigned the same numbers as those elements in FIG. 16 since they are identical. The image processing area 200 is preferably installed on the side of the information processing device, such as a personal computer, and the aforementioned processing is executed by the CPU of the personal computer. Also shown in FIG. 1A is image data transfer component 201a, a subunit of the image processing unit 200. The image data transfer component 201a is responsible for intercepting data transfer interrupts from the image input unit 100 and intiating data transfer of the received image data stored in the input buffer circuitry through enabling the data latches or similar circuitry (not shown) on the ring buffer 201. This is done every time a data transfer interrupt request is detected.

Referring to FIG. 1B, FIG. 1B shows a more detailed block diagram of sensor 101, which includes conventional sensor element 101a and conventional image data generator 101b. FIG. 1(C) similarly shows a more detailed view of sensor 102, which includes sensor element 102a coupled to image data generator 102b.

FIG. 1D depicts a more detailed block diagram of conventional image correction area 33, which includes image corrector 33a coupled to distortion corrector 33b.

FIG. 1E illustrates the buffer switching circuitry in more detail. In this figure, input side buffer switching unit 106 includes a selection circuit 106a connected to buffers 104 and 105 and to sensors 101 and 102. In operation, when the selection circuit 106a detects image data streaming from sensor 101 or 102, it finds a currently unused or empty buffer 104 or 105 in which to store the detected image data. Preferably, this is done by monitoring a reserved memory bit or tag in each buffer 104, 105 indicating whether its corresponding buffer is full (contains image data) or empty in a manner well known in the art.

Once an empty buffer is found, this selection circuit 106a will energize the buffer and notify the storage controller 106b coupled thereto to begin intercepting the streaming image data and routing it to the selected buffer in a well-known manner. The storage controller 106b will continue to download image data to the selected buffer until a predetermined fullness level has been reached, as discussed hereinabove. Then, the selection circuit will switch out the selected buffer (e.g. buffer 104) and switch in the next available buffer (e.g. buffer 105).

FIG. 1E also shows a more detailed block diagram of the output side buffer switching circuit 107, which includes selection circuit 107a and data downloader 107b. Selection circuit 107a is coupled to buffers 104, 105 and selection circuit 106a, and compliments selection circuit 106 in that as selection circuit 106a selects an empty buffer, selection circuit 107a selects the other, full buffer to enable transfer of the image data to the image processing unit 200. Once the full buffer is selected, data downloader 107b energizes the full buffer and transfers the data contained therein to image processing unit 200, as described above.

FIG. 2 shows an example configuration of the image sensor unit of image input unit 100 used in the preferred embodiment. In this type of configuration, images are read at locations corresponding to different scanning time points when the operator manually moves the scanner over the image to be read. Note that only those units of image input area 100 needed for this explanation are shown in FIG. 2, and others have been omitted.

A single line sensor LS, positioned diagonally to the scanning direction of image 111 of characters, etc. written on manuscript 110, is divided into two sensors (corresponding to sensors 101 and 102 in FIG. 1A) in the scanning direction, such that one of the sensors reads an image at a certain location earlier in time and the other sensor reads the same image in the same location at a later time. To implement this operation, two optical fibers 303 and 304 are installed as light guides such that they diverge from each other beginning at sensors 101 and 102, and such that the gap at the tip area is at a specified distance, as shown in FIG. 2.

With this configuration, in the example in the FIG., sensor 101 reads an image at a certain location earlier in time via optical fiber 303, and sensor 102 reads the image in the same location at a later time via optical fiber 304. In other words, an image at a certain location is read twice with the encountered time difference corresponding to the scanning speed.

As explained above, the image data thus read is stored in the first buffer 104, for example, and when a specified amount of image data has been stored in the buffer, subsequent image data will be stored in the second buffer 105. The image data that has been stored in the first buffer 104 is then sent to image processing unit 200. Image processing unit 200 first stores the image data that has been received in ring buffer 201 (the operation of this ring buffer will be explained in detail herein below), and then uses speed detection unit 32 to detect the scanning speed, and image correction unit 33 to perform distortion correction corresponding to the scanning speed.

The operation of the image input device in this type of configuration, shown in FIG. 1A, will be explained in more detail below.

First, when the image input unit possessing the configuration shown in FIG. 2 is moved over an image on a manuscript, sensors 101 and 102 read image data at the same location at different times. If it is assumed that input-side buffer switching unit 106 has selected buffer 104 in FIG. 1A, the image data from sensors 101 and 102 will be stored in buffer 104.

When a specified amount of image data has been stored in this first buffer 104, input-side buffer switching unit 106 selects the second buffer 105, and as a result, the image data from sensors 101 and 102 will be stored in the second buffer 105. On the other hand, output-side buffer switching unit 107 has selected the second buffer 105 up to this point. However, when input-side buffer switching unit 106 selects the second buffer 105, output-side buffer switching unit 107 switches buffer selection to the first buffer 104. After an image data transfer interrupt request is issued to image processing unit 200, the image data stored in the first buffer 104 is sent to image processing unit 200.

FIG. 3A–3D collectively show a timing diagram showing buffer switching and data transfer operations. As shown in FIG. 3, the first buffer 104 receives image data in time t11, and image data is transferred in time t12 immediately after switching occurs to the second buffer 105. This time t12 for image data transfer is relatively instantaneous. Likewise, the second buffer 105, as shown in FIG. 3, receives image data in time t21, and image data is transferred in time t22 immediately after switching occurs to the first buffer 104. FIG. 3 also shows data transfer (see data transfer line), and the correction operation line of FIG. 3 shows the image correction operation (e.g., speed detection and distortion correction) performed by image processing unit 200 on the image data that has been sent. This image correction operation will be explained below in more detail in conjunction with the operation of ring buffer 201.

Next, the operation of ring buffer 201 will be explained with references to FIGS. 4 and 5.

FIG. 4 shows the operation when a personal computer possessing a relatively high processing speed is used for image processing, while FIG. 5 shows the operation when a personal computer possessing a processing speed slower than that in FIG. 4 is used. In these figures, the units filled with left slanted lines (hereafter referred to as "left oblique line units") indicate the image data in the first buffer 104, the heavily stippled areas (hereafter referred to as "heavily stippled areas") indicate the image data in the second buffer 105, and the lightly stippled areas (hereafter referred to as "lightly stippled areas") indicate image correction at image processing unit 200.

First, an explanation will be provided for a case in which a personal computer possessing a relatively high processing speed is used, as in FIG. 4.

The upper portion of FIG. 4 shows the stoppage operations of the first buffer 104 and the second buffer 105 shown in FIG. 1A, and corresponds to the first and second buffer lines of FIG. 3. The lower portion of FIG. 4 labeled ring buffer, shows the change in the content of the memory unit of ring buffer 201 over time.

This ring buffer 201 sequentially stores image data. That is, after one data size (e.g., 512 bytes) worth of image data stored in the first buffer 104 is stored up to a specified unit of the ring buffer, one data size worth of image data stored in the second buffer 105 will be stored in the next area of the ring buffer. This configuration enables the recycling of the memory area, such that, when the memory area becomes full, the image data in the first area is processed (e.g., speed detection and distortion correction), and when that memory area becomes free, the next image data will be stored in that free area.

The sequence of operations is explained below.

First, when image data is stored in the first buffer 104 up to a specified value, an image data transfer interrupt request is sent to image processing area 200. Image processing unit 200 then interrupts any processing it has been performing and accepts the transferred data, and the transferred data is stored in the first area of ring buffer 201 as indicated by the left oblique line area in column (A) of FIG. 4. (Note that, at this point, image input unit 100 is reading image data into the second buffer 105.) While image data is being read into the second buffer 105, image processing area 200 performs image correction on the image data that has already been stored in ring buffer 201 as indicated by column (B) of FIG. 4 (lightly stippled area). This image processing continues until the next image data transfer interrupt request is issued by image input unit 100.

When the reading of image data by image input area 100 into the second buffer 105 is completed and an image data transfer interrupt request is issued to image processing area 200, image processing area 200 interrupts the image correction it has been performing until then and accepts the transferred data. The transferred data is then stored in the next area of ring buffer 201 as indicated by the dotted area in column (B) of FIG. 4 (b). (Note that, at this point, image input area 100 is reading image data into the first buffer 104.)

In column (B), the lightly stippled area indicates that area of the image data first transferred that has been corrected. In other words, this area indicates the unit on which image processing area 200 has performed image processing after image data was stored in ring buffer 201 and before the next image data transfer interrupt request is issued. This figure shows that an image data transfer interrupt request has come in when a small amount of image data remains to be corrected (area indicated by "u"). Note that the lightly stippled area is a "free" area containing no unprocessed image data.

When the reading of image data by image input unit 100 into the first buffer 104 is completed and an image data transfer interrupt request is issued to image processing unit 200, image processing unit 200 interrupts the image correction it has been performing until then and accepts the transferred data. The transferred data is then stored in the next area of ring buffer 201 as indicated by the oblique line unit in column (C) of FIG. 4. (Note that, at this point, image input area 100 is reading image data into the second buffer 105.)

In column(C), the lightly stippled area indicates the area of the image data that has been corrected as mentioned above. This indicates that the correction by image processing area 200 has been completed on the image data that was first received, and the dotted area indicates that an image data transfer interrupt request came in when the processing of the transfer data was half-finished (the area indicated by "u" in column (C)). Note that the lightly stippled area in column (C) is a free area since it has already been processed.

After these operations have been performed and the free area of ring buffer 201 becomes too small to store one data size (512 bytes in this case) worth of image data as shown in column (D) of FIG. 4, as much of the image data in the first buffer 104 as possible will be stored in the last free area of ring buffer 201, and the remainder will be stored beginning at the first address of the free area (upper most left oblique line area) for which processing has already been completed.

In this way, image data is alternately transferred from the first and second buffers 104 and 105 of image input area 100 following interrupt requests. In columns (D)-(6), unit indicated by w, x, y, and ya, and z respectively, depict stored data that has not yet been corrected Image processing area 200 interrupts image correction whenever an image data transfer interrupt request is received, and takes in image data which is then sequentially stored in the specified areas inside ring buffer 201. Then, the maximum amount of data possible within the capability of the personal computer will be processed between the interrupt requests from image input area 100. When the remaining free area of ring buffer 201 becomes too small to store one data size worth of image data, as much of the image data as possible will be stored in the last free area of ring buffer 201, and the remainder will be stored beginning at the first address of the free area (lightly stippled area) for which processing has already been completed, and the next image data is stored in the next area. This operation continues until ring buffer 201 runs out of free area. Note that if the processing speed of the personal computer is fast enough to enable the completion of the processing of one data size worth of image data between interrupt requests from the image input area, ring buffer 201 will never run out of free area.

The above explanation pertains to a case in which a personal computer possessing a relatively high processing speed is used. Next, an explanation will be provided for a case in which a personal computer possessing a relatively slow processing speed is used, as in as in FIG. 5. The operations shown in FIG. 5 are basically the same as those in FIG. 4 except for the speed in which image correction occurs.

When the correction operation (lightly stippled area) in column (B) of FIG. 5 is compared to the correction operation (lightly stippled area) in column (B) of FIG. 4, the amount of image data that can be processed between the interrupt requests from image input unit 100 is smaller in the case of FIG. 5. For example, the amount of data processed (lightly stippled area) up to the point in time indicated by column (D) of FIG. 5 is smaller than that processed up to the same point in time in column (D) of FIG. 4.

FIG. 3 the line labeled in connection operation" in shows the correction operation by a high-speed or low-speed personal computer as a timing diagram. This figure shows that the correction operation by image processing unit 200 is performed between the data transfer from image input unit 100, and remaining areas are processed at the end. Therefore, in FIG. 3, the last correction time t14 is longer than other correction times t13.

As explained above, in this embodiment, by installing ring buffer 201, which acts as explained above inside image processing unit 200, as the buffer for storing the image data transferred from image input unit 100, image processing area 200 interrupts image correction whenever an image data transfer interrupt request is received, and takes in image data which is then sequentially stored in the specified areas inside ring buffer 201. Then, whenever one data size worth of image data is stored in ring buffer 201, image processing unit 200 processes the maximum amount of data possible within the capability of the personal computer until the next interrupt comes in. After repeating such operations, when the remaining free area of ring buffer 201 becomes too small to store one data size worth of image data, as much of the image data as possible will be stored in the last free area of ring buffer 201, and the remainder will be stored beginning at the first address of the free area for which processing has already been completed. The next image data will be stored in the next area, as explained above.

In FIG. 5, similar to FIG. 4, areas indicated by u,v,w,x,$y_1$, $y_2$, $z_1$, and $z_2$ refer to image data contained in ring buffer 201 that hasn't yet been corrected by image processing area 200.

Therefore, the invention has the effect of greatly increasing processing efficiency compared to the previously mentioned conventional method in which correction is performed after all of the image data sent from image input area 100 has been stored in a buffer, and has the substantial effect of reducing the size of the ring buffer used for storing image data compared to the conventional method.

The major characteristic of the invention is that, by using the configuration described above, it enables processing according to the processing speed of the personal computer used, optimally utilizing the capability of the personal computer. In other words, for a personal computer with a relatively high processing speed, the operation shown in FIG. 4 can be performed; for a personal computer with a relatively slow processing speed, the operation shown in FIG. 5 can be performed, thus matching the volume of data to be processed to the capability of the personal computer used. Furthermore, during processing, the buffer areas can be efficiently used because the areas for which processing has been completed become free and can again be used for storing image data. Consequently, the size of the ring buffer can be smaller than the buffer in the conventional method, in which correction must be performed after all of the image data sent from the image input area has been stored therein.

In this embodiment, the image sensor unit in image input area 100 corresponds to the configuration shown in FIG. 2. However, the image sensor unit according to the invention is not limited to such a configuration, nor is it limited to the manual scanning type. Furthermore, in the embodiment, the image data read by the image sensor area is selectively input into two buffers. However, when implementing the invention for a particular application, the configuration of image input unit 100 is not limited to that specifically described herein above.

FIG. 6 shows the configuration of the information input device of the second preferred embodiment. At the outset, this embodiment differs from the previously described embodiment in that character recognition functionality is included. This information input device generally comprises image input unit 100, image processing unit 200, character recognition unit 300, and a second ring buffer 400 which is located between the image processing unit 200 and character recognition unit 300. The character recognition area 300 comprises character extraction area 301, and character code generation area 302, etc.

Since the image input unit 100 and image processing area 200 are identical to those explained in the first embodiment, their explanation will be omitted herein. Image data on which distortion correction has been performed by image processing unit 200 is stored in the ring buffer 400; and the operation of this ring buffer is identical to that of ring buffer 201 of image processing unit 200 in the first embodiment. For the sake of explanation, ring buffer 201 of image processing area 200 will be referred to as "the first ring buffer 201" and ring buffer 400 which stores corrected image data will be referred to as "the second ring buffer 400."

Image processing unit 200, character recognition unit 300, the second ring buffer 400, etc. are installed within information processing equipment, such as a personal computer, and processing is typically performed by the CPU of the personal computer. However, it should be obvious to one skilled in the relevant art that some or all of these tasks could be handled by one or more dedicated subsystem controllers located within or external to a general purpose computer.

An overview of the operation of an information input device possessing such a configuration is as follows. Problems such as distortion in the image data read by image input unit 100 are corrected by image processing unit 200. (Processing operation up to this point is identical to that explained in the first embodiment ). After this corrected image data is stored in the second ring buffer 400, character recognition unit 300 reads the corrected data from the second ring buffer 400, uses character extraction means 301 to extract characters from the image data, and uses character code generation means 302 to generate character codes matching those characters.

This overall operation is further explained with reference to the flow chart shown in FIG. 7.

In FIG. 7, assuming buffer 104 is to be filled first, control begins at step s21 within the image input area and remains until a preset amount of image data has been placed in buffer 104. Thereafter, control passes to step s22, in which buffer switching operations as previously described take place. Specifically, input buffer is switched in to receive image data from the image sensory area and the image data contained in buffer 104 is readied for dispatch to the image processing area 200. Thereafter, a data transfer interrupt is sent from the image input unit 100 to the image processing unit 200 in step s23, and acceptance of the buffered image data from buffer 104 begins at step s24 by the image processing unit 200.

Meanwhile, at step s25, the image input area of the second embodiment is filling the contents of buffer 105 with newly acquired image data. As before, processing remains at this step until the image input area perceives the second buffer 105 to be full enough for image data transfer to resume. Thereafter, control passes to step s26, where buffer switching complementing the switches made in step s22 is performed. At step s27, the first buffer 104 begins receiving image data, and at the same time an image data transfer interrupt request is sent to image processing unit 200. Image processing unit 200 receives this interrupt request and now accepts the image data from the second buffer 105. This process is repeated until all scanned image data has been received. Note that the image data transfer interrupt request is also issued to character recognition unit 300. This point will be explained further below.

Image processing unit 200 interrupts the image correction it has been performing whenever an image data transfer interrupt request is received from image input unit 100, and accepts the image data being sent. Based on this image data, image processing unit 200 uses speed detection unit 32 to determine the scanning speed of the image data that has been received as indicated in step s28, and then uses this scanning speed and image correction unit 33 to perform distortion correction as shown in step s29. This image correction is performed until the next image data transfer interrupt request is received. If processing has not been completed when the next image data transfer interrupt request comes in, processing is interrupted and the image data being transferred is received. If character recognition unit 300 is performing character recognition when this image correction process (speed detection and distortion correction) is required, an image processing interrupt request is issued to character recognition unit 300. Character recognition unit 300 will then interrupt the processing it has been performing (either steps 30 or 531)when it receives an image processing interrupt request from image processing area 200.

Character recognition unit 300 uses character extraction unit 301 to extract characters from the corrected image data (step s30) after image correction by image processing unit 200 is completed and before the next image data transfer interrupt request comes in, and then uses character code generation unit 302 to generate character codes matching the extracted characters (step s31). Control then passes back to step s30 to extract and decode another set of characters.

In the case of an information input device in which character recognition unit 300, connected to image processing unit 200, performs character recognition and then outputs character codes matching the characters, correction by image processing unit 200 need only be at a level sufficient to enable character recognition unit 300 to perform character recognition. That is, in the information input device that comprises image input unit 100 and image processing unit 200, and in which the output from this image processing unit 200 is used as image information as is, the accuracy of the image correction, such as distortion correction, by image processing unit 200 must be extremely high. However, when character recognition unit 300 is connected, the quality of image processing by image processing unit 200 can be much lower.

The operation of second preferred embodiment is explained below.

FIGS. 8A–8E collectively depict a timing diagram showing switching between the first buffer 104 and the second buffer 105 of the image input area 100, image data transfer and correction (speed detection, distortion correction, etc.) by image processing area 200, and character recognition (character extraction, character code generation, etc.) by character recognition area 300. As shown in FIG. 8A, and as explained hereinabove, the first buffer 104 receives image data in time t11, and the image data is transferred in time t12 immediately after switching occurs to the second buffer 105. Likewise, the second buffer 105, as shown in FIG. 8B, receives image data in time t21, and image data is transferred in time t22 immediately after switching occurs to the first buffer 104. FIG. 8C shows data transfer timing, and FIG. 8D shows the image correction operation timing performed by image processing area 200 on the image which has been transferred. FIG. 8E shows the character recognition operation timing by character recognition area 300.

As evident from FIG. 8D, this is an example in which a personal computer possessing ample processing speed is used, and thus the image correction operation by image processing area 200 can be easily completed before the next image data transfer interrupt comes in. Therefore, character recognition is performed during the time after image correction is completed and before the next image data transfer interrupt request comes in, as shown in FIG. 8E. As illustrated therein, the last recognition time is longer because remaining unprocessed image data is processed here. The upper portion of FIG. 9, labeled "first buffer" and "Second Buffer" shows operation of the first buffer 104 and the second buffer 105, within correspond to the two uppermost lines of FIG. 8. The middle portion of FIG. 9, labeled "first ring buffer", depicts the change in the contents of the memory area at the first ring buffer 201 over time. The lower post portion of FIG. 9, labeled "second right buffer", shows the change in the content of the memory area of the second ring buffer 400 over time.

The operation indicated by the first ring buffer shown in FIG. 9 is basically identical to the operation of image processing unit 200 described in relation to FIG. 4, except for the correction speed.

That is, the image correction operation by image processing unit 200 can be easily completed before the next interrupt comes in. Actually, the processing speed is fast enough to leave ample time, and character recognition is performed during this extra time, as indicated by the second ring buffer portion of FIG. 9. Note that this character recognition operation has left some data unprocessed because one data size worth of data had not been completely processed before the next interrupt request came in came in from image input unit 100. This character recognition operation is indicated by the right slanted or oblique area area in the figure.

This operation is explained below.

Specifically, when image data is stored up to a set value in the first buffer 104, an image data transfer interrupt request is sent to image processing unit 200; image processing unit 200 interrupts the processing it had been performing until then and accepts the transferred data; the transferred data is stored in the first area of ring buffer 201 as indicated by the left oblique line area in column(A) of FIG. 9. (Note that, at this point, image input unit 100 is reading image data into the second buffer 105.) While image data is being read into this second buffer 105, image processing unit 200 performs image correction on the image data that has already been stored in the first ring buffer 201, as indicated by the lightly stippled area in column (B) of FIG. 9. The operation of storing image data in this first ring buffer 201 is the same as that explained for the first embodiment, and thus its explanation is omitted herein. Note, however, that image correction operation in this case is completed before the next image data transfer interrupt request is issued by image input unit 100, with extra time remaining, as shown in FIG. 8 (D), which is different from the case in the previous examples. Hence, there are no uncollected areas indicated in the figure, as opposed to FIGS. 4 and 5 (regions u,v,w,x,y, and $y_2$, $z_1$ and $z_2$).

The image data which has been corrected is stored in the second ring buffer 400 (lightly stippled area) as shown in column (B) of the lowest portion of FIG. 9, and the extra time is used for character recognition as indicated by the meshed area in column (C) of FIG. 9. This character recognition operation is performed until the next image data transfer interrupt request is issued by image input area 100, and in this case the character recognition operation was not completed within the time available, leaving some data unprocessed, herein indicated by "m".

Next, the image data which has been corrected by image processing unit 200 is stored in the second ring buffer 400 as shown by the lightly stippled area in column (C) of FIG. 9. The time available until the next image data transfer interrupt request comes in is used for completing the processing that was left unfinished in column (C), and then for performing character recognition on the image data that has newly been stored, as shown by column (D) of FIG. 9. Note that, in this figure, "m" indicates an area that was left unfinished, i.e., area for which character recognition was not performed. Therefore, character recognition is first performed on this unfinished area, and then on the image data that has newly been stored.

In this way, when the image data transferred from image input unit 100 is stored in the first ring buffer 201, the transferred image data is corrected before the next image data transfer interrupt request is issued, and the extra time available is used for character recognition. This entire process is repeated until all image data has been corrected and recognized. On the other hand, when all of the memory areas in the first ring buffer 201 are used up, image data is again stored beginning at the first address of the free area for which processing has already been completed, as indicated by the steps beginning with column (D). Likewise, when all of the memory areas in the second ring buffer 400 are used up, image data again is stored beginning at the first address of the free area for which character recognition has already been completed, as indicated by the steps beginning with column (F) of lowest portion of FIG. 9.

The operations described above take place when a high-speed personal computer is used. In other words, because a high-speed personal computer is allowed to fully utilize its high-speed processing capability, and can repeatedly store image data in free areas for which processing has already been completed, it can efficiently utilize buffers and as a result does not require large buffers for storing all of the image data as is the case in conventional methods.

In the example described above, a single CPU (personal computer) is used for both image correction and character recognition. However, if these functions are performed by independent CPUs (personal computers), the speed required to complete image correction before the next image data is received need not be as fast as that required with a single CPU.

This operation is explained below with reference to FIG. 10.

The top portion of FIG. 10 shows the operations of the first buffer 104 and the second buffer 105 of image input unit 100; and the middle and bottom portions show the operations of the first ring buffer 201 and the second ring buffer 400, respectively. These operations are basically the same as those described above. In particular, because the processing speed of the personal computer that performs image correction in this case can be considered to be about the same as that explained in FIG. 4, the states of image data storage in the first ring buffer 201 are identical to those shown in FIG. 4.

On the other hand, character recognition unit 300 uses a different processor from that used for the image correction, to process the corrected image data that has been stored in the second ring buffer 400 as indicated by the lightly stippled area in the lower most portion of FIG. 10. The operation for storing image data in the second ring buffer 400, and the operation for extracting stored image data for character recognition are identical to those explained in FIG. 9.

If independent CPUs are used for image correction and character recognition, the speed required to complete image correction before the next image data is received need not be as fast as that required with a single CPU. Therefore, processing can be performed that fully utilizes the processing capability of the personal computer used, by taking its processing speed into consideration. Furthermore, because image data can be repeatedly stored in free areas for which processing has already been completed, buffers can be efficiently utilized. As a result, there is no need for the large buffers needed for storing all of the image data, in the case of conventional methods.

The above explanation focused mainly on the operations of the ring buffers which enable processing that matches the processing speed of the personal computer used. Next, the relationship between these operations and the abovementioned interrupt requests will be explained.

As described in the explanation of the prior art, a processing method which performs each step in a time series is available as one of the methods in which image data is first input and character recognition is then performed after the image data has been corrected. In such a method, character recognition must be completed before the next image data transfer interrupt request is received. Consequently, if a personal computer with a slow processing speed is used, an image data transfer interrupt request might be issued while image correction is still ongoing, and as a result image data receipt timing might be missed. Furthermore, because the processing steps are constant, it is necessary to design all process programs to match the slowest personal computer. However, doing so will result in much wasted wait time for high-speed personal computers.

To solve such a problem, the second embodiment of the present invention uses two types of interrupt requests. The image data transfer interrupt request issued by image input unit 100 to image processing unit 200 is different from the image correction interrupt request issued by image processing unit 200 to character recognition unit 300 in order to perform distortion correction. Furthermore, by assigning processing priority 1 to image data transfer, processing priority 2 to image correction, and processing priority 3 to character recognition, the invention performs processing according to this priority at a level that matches the processing capability of the personal computer.

This process is explained below with reference to FIG. 11.

FIG. 11 (A) is a timing diagram showing processing by a high-speed personal computer that can complete the process up to character recognition before the next image data transfer interrupt request comes in; FIG. 11 (B) is a timing diagram showing processing by a low-speed personal computer that cannot complete the process before the next image data transfer interrupt request comes in.

As described above, FIG. 11 (A) shows the processing by a high-speed personal computer that can complete the process up to character recognition before the next image data transfer interrupt request comes in. Image data is transferred when image data transfer interrupt request W1 comes in from image input unit 100 at T10, and that image data is stored in the first ring buffer 201 (lightly stippled unit in the figure). Subsequently, after image processing unit 200 performs distortion correction (left oblique area) by issuing an interrupt request to character recognition unit 300 at T11, character recognition unit 300 performs character recognition (heavily stippled area). This series of processes is completed before the next image data transfer interrupt request W2 comes in at T20. When the next image data transfer interrupt request W2 comes in at T20, image data is transferred as before (lightly stippled area in the figure.), and after image processing unit 200 performs distortion correction (left oblique line area) by issuing an interrupt request to character recognition unit 300 at T21, character recognition unit 300 performs character recognition (heavily stippled area). This series of processes is also completed before the next image data transfer interrupt request W3 comes in at T30. Note that, in the FIG., D1, D2, D3, . . . indicate a series of processes performed on the image data that has been transferred based on a single image data transfer interrupt request, i.e., a series of processes performed before the next image data transfer interrupt request comes in. For example, D1 indicates image transfer, image correction, and character recognition which are performed before image data transfer interrupt request W2 comes in at T20; D2 indicates image transfer, image correction, and character recognition which are performed before image data transfer interrupt request W3 comes in at T30.

On the other hand, FIG. 11 (B) shows the processing by a low-speed personal computer that cannot complete the process before the next image data transfer interrupt request comes in. This processing is explained below.

First, image data is transferred when image data transfer interrupt request W1 comes in from image input unit 100 at T10, and that image data is stored in the first ring buffer 201

(lightly stippled line area in the figure). Subsequently, image processing unit 200 performs distortion correction (left oblique line area) by issuing an interrupt request to character recognition unit 300 at T12. However, the next image data transfer interrupt request W2 comes in at T20 when this correction has not been completed. Consequently, image processing unit 200 interrupts the correction it has been performing up to that point, and receives the next image data. The processing up to the point at which correction is interrupted is indicated by D1 in the FIG.

In this way, the next image data is transferred when image data transfer interrupt request W2 comes in at T20, and that image data is stored in the first ring buffer 201 (lightly stippled area in the figure). When the receipt of the image data being transferred is completed at T22, image processing unit 200 performs distortion correction (left oblique line area). However, this distortion correction is performed on the area for which the distortion correction was interrupted in the previous round (area indicated by the left oblique line areas and beyond in process D1). If the next image data transfer interrupt request W3 comes in at T30 while image processing unit 200 is still performing distortion correction on the unfinished area, the processing is again interrupted, and the next image data being transferred will be accepted. D2 in the figure indicates the period between the receipt of image data transfer interrupt request W2 and the interruption of distortion correction with the receipt of image data transfer interrupt request W3.

When image data transfer interrupt request W3 comes in at T30 in this way, the next image data is transferred and that image data is stored in the first ring buffer 201 (lightly stippled area of the figure). Subsequently, image processing unit 200 performs distortion correction (left oblique line area) by issuing an interrupt request to character recognition unit 300 at T32. However, this distortion correction is performed on the area for which the distortion correction was interrupted in the previous round (area indicated by the left oblique lines and beyond in process D2). The processing of the area for which processing had been interrupted is completed at T33, and the correction of the image data that had been transferred based on the first image data transfer interrupt request W1 is now finished.

After the correction of the first image data has been completed, the next image data transfer interrupt request W4 comes in at T40. However, in this case, time Δt is available between the completion of the correction of the first image data and the receipt of the next image data transfer interrupt request W4 at T40, as shown in the figure. In other words, image correction of one data size worth of image data has been completed before the next image data transfer interrupt request comes in, leaving the extra time Δt. Therefore, using this extra time Δt, the image data that had been transferred based on the second image data transfer interrupt request W2 is corrected. However, this correction process is interrupted when the next image data transfer interrupt request W4 comes in at T40, and the next image data being transferred is accepted. D3 in the FIG. indicates the period between the receipt of image data transfer interrupt request W3 and the interruption of distortion correction with the receipt of image data transfer interrupt request W4.

When image data transfer interrupt request W4 comes in at T40 in this way, the next image data is transferred and that image data is stored in the first ring buffer 201 (lightly stippled area of the figure). Subsequently, image processing unit 200 performs distortion correction (left oblique line area) by issuing an interrupt request to character recognition unit 300 at T42. However, this distortion correction is performed on the area for which the distortion correction was interrupted in the previous round (area indicated by the left oblique line area and beyond in process D3).

For the ease of explanation, image data transfer interrupt requests only up to W4 are used here. Therefore, after this image data transfer interrupt request W4 is issued, image correction is performed on the data for which correction has not been completed, i.e., the unprocessed portion of the image data that had been transferred based on the second image data transfer interrupt request W2, all of the image data that had been transferred based on the third and fourth image data transfer interrupt requests W3 and W4. When these processes are completed, the correction of all of the image data that had been transferred is now finished. In FIG. 11 (B), P1 indicates the correction completion time of the image data that had been transferred based on the first image data transfer interrupt request W1; P2 indicates the correction completion time of the image data that had been transferred based on the second image data transfer interrupt request W2; P3 indicates the correction completion time of the image data that had been transferred based on the third image data transfer interrupt request W3; and P4 indicates the correction completion time of the image data that had been transferred based on the fourth image data transfer interrupt request W4.

These image data that have been corrected in this way are sequentially stored in the second ring buffer 400, and then character recognition unit 300 performs character recognition (heavily stippled area in the figure) on these stored data. Note that if two CPUs (personal computers) are used, image correction and character recognition can be performed in parallel, as explained earlier.

As explained above, the second embodiment of the present invention uses two types of interrupt requests. The image data transfer interrupt request issued by image input unit 100 to image processing unit 200 is different from the image correction interrupt request issued by image processing unit 200 to character recognition unit 300 in order to perform distortion correction. Furthermore, by assigning processing priority in the order of image data transfer, image correction, and character recognition, the invention performs processing according to this priority, at a level that matches the processing capability of the personal computer used. Therefore, a high-speed personal computer can perform processing fully utilizing its high-speed capability, as explained in FIG. 11 (A); a low-speed personal computer can perform processing that matches its processing speed, as explained in FIG. 11 (B). As a result, it is no longer necessary to design all process programs to match the slowest personal computer, which would result in much wasted wait time for high-speed personal computers.

Furthermore, in the second embodiment according to the present invention, the image data transfer interrupt request from the image input unit 100 is generated by hardware, and the image processing interrupt request issued by image processing unit 200 to character recognition unit 300 is timer-based. This is because the image input state at image input unit 100 is invisible to image processing unit 200, so a hardware interrupt is considered to be more effective when transferring image data from image input unit 100 to image processing area 200. On the other hand, it is considered more effective to issue an interrupt request for image correction from image processing unit 200 to character recognition unit 300 at a specified timing after the receipt of the transferred data has been completed.

FIG. 12 is a block diagram showing the above processing. In this figure, timer interrupt control area 500, which generates interrupt requests for image correction to character recognition unit 300, is installed, in addition to image input unit 100, image processing area 200, and character recognition area 300. This process is explained below with reference to the flow chart in FIG. 13.

In FIG. 13, control within the image input unit 100 begins at step s40. At step s40, this image input area sets the image data it has read in its own buffer, it issues a hardware image data transfer interrupt request for transferring this image data to image processing unit 200. If, at that time, processing is ongoing at image processing unit 200 or character recognition unit 300, that processing is interrupted and image data is transferred to image processing unit 200.

In other words, after the size of the image data to be read is verified at step s41, image processing unit 200 inputs image data synchronously with the read signal (step s42), and determines whether or not the image data input has been completed (step s43). If image processing unit 200 has completed transfer data input, it then determines whether or not the image data was input during image correction (step s44).

If it is determined here that the image data was accepted during image correction, the processing returns to image correction. Image correction is then resumed, and thereafter processing that matches the capability of the personal computer used takes place. On the other hand, if it is determined that image correction was not taking place in the step s44, it is assumed that the image data was input during character recognition. A timer set request is then issued to timer interrupt control area 500, and the timer of timer interrupt control area 500 will be set (step s45).

With this setting, timer interrupt control unit 500 issues an image correction interrupt request to character recognition unit 300 after a specified duration of time (for example 20 msec), interrupts the character recognition operation, and moves on to image correction.

Note that, during the processing described above, image input unit 100 increments the buffer address synchronously with the read signal from image processing unit 200, when the image processing unit 200 reads one data size worth of image data.

In the second embodiment according to the invention, an image data transfer interrupt request can be accepted even while image processing unit 200 is performing image correction by issuing an image correction interrupt request to character recognition unit 300. Normally, other interrupt requests cannot be accepted while an interrupt processing is already taking place. However, because it is necessary to give priority to image data transfer, the design of the invention allows an image data transfer interrupt request to be acknowledged even while image correction is taking place based on an image correction interrupt. In this way, it is possible to assign processing priority in the order of image data transfer, image correction, and character recognition, as described above. Image correction is performed according to the processing speed of the personal computer after image data has been input based on an image data transfer interrupt request but before the next image data transfer interrupt request comes in; character recognition is performed according to the processing speed of the personal computer after image correction is completed but before the next data transfer interrupt request comes in. Thus, processing can be performed based on the priority order and according to the processing speed of the personal computer.

As explained earlier, image processing unit 200 completes the transfer data input, and then determines whether or not the image data was input during image correction. If it is determined that the image data was accepted during image correction, no timer interrupt is issued to character recognition unit 300 and the processing is forced back to image correction. If the personal computer possesses a fast enough processing speed, it can perform image processing using an image correction interrupt request whenever image data input is completed. However, if the processing speed of the personal computer is slow, an image data transfer interrupt request is likely to come in while image correction is taking place. In such a case, although the processing automatically shifts to image correction when image data receipt is finished, correct operation of the personal computer cannot be guaranteed if another image correction interrupt comes in. Therefore, if it is determined that the image data was accepted during image correction, no timer interrupt is issued to character recognition unit 300 and the processing is automatically returned to image correction. The rest of the processing is performed according to the capability of the personal computer.

By contrast, if the personal computer can complete image correction after image data has been input but before the next image data transfer interrupt request comes in, even leaving some extra time available for character recognition, as shown in FIG. 8, the image data transfer interrupt request will come in while character recognition is taking place.

If the image data transfer interrupt request comes in while character recognition is taking place in this way, processing will be returned to image correction after image data input is completed. Therefore, in such a case, it is possible to preset the timer such that it issues image correction requests synchronously with the cycle of image data transfer interrupt requests.

In this way, when an image data transfer interrupt request comes in, processing can be automatically returned to image correction after a specified time period, without the need to have image processing unit 200 issue a timer set request to timer interrupt control unit 500. FIG. 14 is a block diagram showing how this operation is carried out. Unlike the case in FIG. 12, it is no longer necessary for image processing unit 200 to issue a timer set request to timer interrupt control area In this embodiment, the image sensor area in image input area 100 is used as configured in FIG. 2. However, the image sensor unit is not limited to such a configuration, nor is it limited to the manual scanning type. Furthermore, in the embodiment, the image data read by the image sensor area is selectively input into two buffers. However, when implementing the invention, the configuration of image input unit 100 is not limited to that described in the embodiment.

As explained above, the techniques of the present invention enable processing according to the processing speed of the personal computer used and optimal utilization of the capability of the personal computer. This is especially the case in which a handheld-scanning device is used. Heretofore, conventional methods had to design all process programs to match the slowest personal computer, which resulted in much wasted wait time for high-speed personal computers, lowering processing efficiency, and preventing the full utilization of their processing capability. In contrast, the invention allows a personal computer possessing a high processing speed to process a large amount of data, matching its capability, and allows a personal computer possessing a slow processing speed to process the amount of data that matches its capability, thus optimizing the amounts of data processed in both cases. Furthermore, the buffer areas can be efficiently utilized during processing because the areas inside the ring buffer for which processing has been completed become free and available again for image data storage. Consequently, the size of the ring buffer can be much smaller than that required in conventional methods in which image correction is performed after all of the image data sent from the image input area is stored in the buffer.

Furthermore, at least two buffers are installed on the image input unit, and use of the buffers is switched after image data stored in one of the buffers reaches a specified set value. Image data is then stored up to a specified set value in the other buffer, while at the same time the image data that has been stored in the first buffer is transferred to the image processing unit so that speed detection and distortion correction can be performed. Consequently, in image input devices requiring speed detection and distortion correction, the time conventionally wasted for communication, such as wait time, can be drastically reduced, and the image input processing completion time can be significantly shortened.

Additionally, by using a ring buffer to store image data that has been corrected, the ring buffer areas can be efficiently utilized with memory recycling because the areas inside the ring buffer for which character recognition has been completed become free and available again for image data storage. Consequently, the size of the ring buffer can be much smaller than that required in conventional methods, in which image correction is performed after all of the image data sent from the image input area is stored in the buffer.

Furthermore, by assigning processing priority and allowing the personal computer to process image data according to this priority, and at its own pace, the techniques of the present invention enable processing according to the processing speed of the personal computer used and optimal utilization of the capability of the personal computer. In other words, as explained above, the invention permits a personal computer possessing a high processing speed to process a large amount of data, matching its capability, and allows a personal computer possessing a slow processing speed to process the amount of data that matches its capability.

Additionally, since a hardware interrupt from the image input unit can be used for transferring image data, it is no longer necessary for the image input unit to monitor or poll for image data input status. Furthermore, since the interrupt request to be issued to the character recognition unit for performing image correction is issued at a certain timing following the receipt of the transferred data, timer interrupt is used. In this way, image correction can always be performed on the image data that has been received, and thus it is no longer necessary for the character recognition area to monitor the image processing unit. Also, since the image data transfer interrupt request issued by the image input unit to the image processing unit is acknowledged even while the image processing unit is performing image correction, image data transfer can be executed at a higher priority, ensuring the priority order of image data transfer, image correction, and character recognition, and enabling the most efficient processing procedure.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

What is claimed:

1. An information input device that scans in character and graphical information, corrects the scanned information, and outputs the corrected scan information in computer-readable form, comprising:

an image input circuit to acquire the character and graphical information from a manuscript, said image input circuit including an image sensor capable of reading the character and graphical information from the manuscript when illuminated by a light source and converting the read in character and graphical information into corresponding image data; and an image processing device coupled to said image input circuit, said image processing device comprising:

a ring buffer to receive and store plural blocks of the image data generated by said image input circuit on a per block basis, said ring buffer having a predetermined depth and each block of image data having a specified data size, said ring buffer comprising means for storing a received one of the image data blocks in:

plural, non-contiguously addressed areas of said ring buffer when sequentially storing the received image data block exceeds the depth of said ring buffer; and a sequential, contiguously addressed area of said ring buffer when sequentially storing the received image data block fails to exceed the depth of said ring buffer; and an image correction mean coupled to said ring buffer for performing image correction on the image data stored in said ring buffer.

2. The information input device of claim 1, wherein said image input circuit comprises a manual-type scanning device.

3. The information input device of claim 1, wherein said image processing device comprises a general purpose computer.

4. The information input device of claim 1, wherein said image processing device comprises a dedicated, software-driven controller.

5. The information input device of claim 1, wherein said image input circuit further comprises:

a plurality of input buffers switchably coupled in parallel to said image sensor and said image processing device, each of said input buffers to hold at least one block of the image data generated by said image sensor;

a first buffer switching circuit coupled to said image sensor and said input buffers for selectively driving each said input buffer, comprising:

a first selection means for selecting an empty input buffer upon receipt of image data generated by said image sensor;

a storing area coupled to said first selection area and said input buffers for storing the received image data in said selected empty input buffer until the specified data size has been reached, tagging said selected empty input buffer as full, deselecting said full input buffer, and notifying said first selection means to select another empty input buffer; and a second buffer switching circuit coupled to said first buffer switching circuit, said input buffers, and said image processing device, comprising:

a second selection means coupled to said first buffer switching circuit and said input buffers for selecting said full input buffer when said first buffer switching circuit selects another empty input buffer; and a data downloading means coupled to said input buffers and said image processing device for downloading the at least one image data block contained in said selected full buffer to said image processing device, tagging said selected full input buffer as empty when downloading operations are complete, and deselecting said selected empty input buffer.

6. The information input device of claim 1, wherein
said image input circuit further comprises an image data transfer requester interposing said image sensor and said image processing device to notify said image processing device when said image input circuit is ready to transfer at least one block of the image data; and wherein said image processing device further comprises an image data transfer component coupled to said image data transfer requester and said ring buffer to monitor said image data transfer requester and enable transfer of the at least one block of image data to said ring buffer when notified by said data transfer requestor.

7. The information input device of claim 6, wherein
said image data transfer requestor notifies said image processing device through a nonmaskable hardware interrupt;

wherein said image data transfer component of said image processing device only enables transfer of the image data generated by said image input circuit upon receipt of the nonmaskable hardware interrupt; and wherein said image correction means performs correction operations only after said nonmaskable hardware interrupt is serviced and said ring buffer has completed transfer of the at least one block of image data.

8. An information input device that scans in character and graphical information, corrects the scanned information, and outputs the corrected scan information in computer-readable form, comprising:

an image input circuit to acquire the character and graphical information from a manuscript, said image input circuit comprising:

an image sensor comprising:

a plurality of sensor elements spaced a preselected distance apart which can read in character and graphical information contained on different portions of a manuscript; and image data generation means coupled to each said image sensor elements for generating image data corresponding to the character and graphical information read in by said image sensor; and input buffering circuitry coupled to said image data generation area to temporarily store a block of the image data having a specified data size; and an image processing device coupled to said image input circuit, said image processing device comprising:

an image data transfer component coupled to said input buffering circuitry for transferring the specifically-sized image data block from said input image circuit;

a ring buffer coupled to said image data transfer component and said buffering circuitry to store the transferred image data block in:

plural, non-contiguously addressed areas of said ring buffer when sequentially storing the transferred image data block exceeds a depth of said ring buffer; and a sequential contiguously addressed area of said ring buffer when sequentially storing the transferred image data block fails to exceed the depth of said ring buffer;

a speed detection means coupled to said ring buffer for determining a scanning speed based on the transferred image data block, corresponding image data already contained in said ring buffer, and the preselected sensor element spacing; and an image correction means coupled to said ring buffer and speed detection means for performing image correction on the image data stored in said ring buffer, said image correction means including a distortion correction element that corrects distortions in the image data contained in said ring buffer according to the scanning speed determined by said speed detection means.

9. The information input device of claim 8, wherein said image input circuit comprises a manual-type scanning device.

10. The information input device of claim 8, wherein said image processing device comprises a general purpose computer.

11. The information input device of claim 8, wherein said image processing device comprises a dedicated, software-driven microcontroller.

12. The information input device of claim 8, wherein
said input buffering circuitry comprises:

a plurality of input buffers switchably coupled in parallel to said image data generation means and said image processing device;

a first buffer switching circuit coupled to each said image data generation means and said input buffers for selectively driving each said input buffer, comprising:

a first selection area for selecting an empty input buffer upon receipt of image data generated by said image data generation means; and a storing means coupled to said first selection means and said input buffers for storing the received image data in said selected empty input buffer until the specified data size has been reached, tagging said selected empty input buffer as full, deselecting said full input buffer, and notifying said first selection means to select another empty input buffer; and a second buffer switching circuit coupled to said first buffer switching circuit, said input buffers, and said image processing device, comprising:

a second selection means coupled to said first buffer switching circuit and said input buffers for selecting said full input buffer when said first buffer switching circuit selects another empty input buffer; and a data downloading means coupled to said input buffers and said image processing device for downloading the image data block contained in said selected full buffer to said image processing device, tagging said selected full input buffer as empty when downloading operations are complete, and deselecting said selected empty input buffer.

13. The information input device of claim 8, wherein
said image input circuit further comprises an image data transfer requestor interposing said image generation means and said image processing device to notify said image processing device when said image input circuit is ready to transfer the image data block; and wherein said data transfer component is coupled to said image data transfer requestor to monitor said image data transfer requestor and transfer the image data block held in said input buffering circuitry when notified by said data transfer requestor.

14. The information input device of claim 13, wherein said image data transfer requestor notifies said image processing device through a nonmaskable hardware interrupt;

wherein said image data transfer component of said image processing device only initiates transfer of the image data block held in said input buffering circuitry upon receipt of the nonmaskable hardware interrupt; and wherein said image correction means performs correction operations only after said nonmaskable hardware interrupt is serviced and said ring buffer has completed transfer of the image data block.

15. An information input device that scans in character and graphical information, corrects the scanned information, extracts character codes from the corrected scanned information where appropriate, and outputs the corrected scan information including any extracted character codes in computer-readable form, comprising:

an image input circuit to acquire the character and graphical information from a manuscript, said image input circuit including an image sensor capable of reading the character and graphical information from the manuscript when illuminated by a light source and converting the read in character and graphical information into corresponding image data;

an image processing device coupled to said image input circuit, said image processing device comprising:

a first ring buffer to receive and store plural blocks of the image data generated by said image input circuit on a per block basis, said first ring buffer having a predetermined depth and each block of image data having a specified data size, said first ring buffer comprising means for storing a received one of the image data blocks in:

plural, non-contiguously addressed areas of said first ring buffer when sequentially storing the received image data block exceeds the depth of said first ring buffer; and a sequential, contiguously addressed area of said first ring buffer when sequentially storing the received image data block fails to exceed the depth of said first ring buffer; and an image correction means coupled to said first ring buffer for performing image correction on the image data stored in said first ring buffer;

a character recognizer, comprising:

a character extraction means coupled to said image processing device for extracting characters from corrected image data processed by said image processing device; and a character code generation means for converting the extracted characters in corresponding character codes; and a FIFO buffer connected between said image correction means and said character recognizer to store corrected image data processed by said image processing device.

16. The information input device of claim 15, wherein said FIFO buffer comprises a second ring buffer for memory-efficient storage and flexible transfer of the corrected image data to said character recognizer.

17. The information input device of claim 15, wherein said image input circuit comprises a manual-type scanning device.

18. The information input device of claim 15, wherein said image processing device and said character recognizer are controlled by a general purpose computer.

19. The information input device of claim 15, wherein said image processing device and said character recognizer are controlled by a dedicated, software-driven controller.

20. The information input device of claim 15, wherein said image input circuit further comprises:

a plurality of input buffers switchably coupled in parallel to said image sensor and said image processing device, each of said iniput buffers to hold at least one block of the image data generated by said image sensor;

a first buffer switching circuit coupled to said image sensor and said input buffers for selectively driving each said input buffer, comprising:

a first selection means for selecting an empty input buffer upon receipt of image data generated by said image sensor;

a storing means coupled to said first selection means and said input buffers for storing the received image data in said selected empty input buffer until the specified data size has been reached, tagging said selected empty input buffer as full, deselecting said full input buffer, and notifying said first selection means to select another empty input buffer; and a second buffer switching circuit coupled to said first buffer switching circuit, said input buffers, and said image processing device, comprising:

a second selection means coupled to said first buffer switching circuit and said input buffers for selecting said full input buffer when said first buffer switching circuit selects another empty input buffer; and a data downloading means coupled to said input buffers and said image processing device for downloading the at least one image data block contained in said selected full buffer to said image processing device, tagging said selected full input buffer as empty when downloading operations are complete, and deselecting said selected empty input buffer.

21. The information input device of claim 15, wherein said image input circuit further comprises an image data transfer requestor interposing said image sensor and said image processing device to notify said image processing device when said image input circuit is ready to transfer at least one block of the image data; and wherein said image processing device further comprises an image data transfer component coupled to said image data transfer requestor and said first ring buffer to monitor said image data transfer requestor and transfer the at least one block of the image data when notified by said data transfer requestor.

22. The information input device of claim 21, wherein said image data transfer requestor notifies said image processing device through a nonmaskable hardware interrupt;

wherein said image data transfer component of said image processing device only initiates transfer of the at least one block of the image data generated by said image input circuit upon receipt of the nonmaskable hardware interrupt; and wherein said image correction means performs correction operations only after said nonmaskable hardware interrupt is serviced and said first ring buffer has completed transfer of the at least one block of the image data.

23. The information input device of claim 15, wherein said image correction device further comprises a character recognition notification requestor coupled to said character recognizer and said first ring buffer to notify said character recognizer when sized image data stored in said first ring buffer is ready to be corrected; and wherein said character recognizer monitors said image correction notification requestor and performs character recognition operations only after receipt of the character recognition notification.

24. The information input device of claim 15, wherein said image input circuit further comprises an image data transfer requestor connected between said image sensor and said image processing device, and coupled to said character recognizer, to notify said image processing device and said character recognizer when said image input circuit is ready to transfer at least one block of the image data;

wherein said image processing device further comprises an image data transfer component coupled to said image data transfer requestor and said first ring buffer to monitor said image data transfer requestor and transfer the at least one block of the image data only when notified by said data transfer requestor;

wherein said image correction device further comprises a character recognition notification requestor coupled to said character recognizer and said first ring buffer to notify said character recognizer when sized image data stored in said first ring buffer is ready to be corrected; and wherein said character recognizer monitors said image correction notification requestor and said image data transfer requestor, and performs character recognition operations only after receiving said character recognition request notification and in the absence of said image data transfer request notification.

25. The information input device of claim 24, wherein said image data transfer requestor notifies said image processing device and said character recognizer through a nonmaskable hardware interrupt;

wherein said image data transfer component of said image processing device only initiates transfer of the at least one block of the image data generated by said image input circuit upon receipt of the nonmaskable hardware interrupt;

wherein said image correction means performs correction operations only after said nonmaskable hardware interrupt is serviced and image data transfer component has completed transfer of the at least one block of the image data wherein said image correction notification requestor comprises a watchdog timer for periodically notifying said character recognizer of pending corrected image data contained in said second ring buffer via a timer interrupt having a lower priority than the nonmaskable hardware interrupt; and wherein said character recognizer performs character extraction and recognition operations only after receipt of the timer interrupt and in the absence of the nonmaskable hardware interrupt.

26. An information input device that scans in character and graphical information, corrects the scanned information, extracts character codes from the corrected scanned information where appropriate, and outputs the corrected scan information including any extracted character codes in computer-readable form, comprising:

an image input circuit to acquire the character and graphical information from a manuscript, said image input circuit comprising:

an image sensor having a plurality of sensor elements spaced a preselected distance apart which can read in character and graphical information contained on different portions of a manuscript;

image data generation means coupled to said image sensor elements for generating image data corresponding to the character and graphical information read in by said image sensor; and input buffering circuitry coupled to said image data generation area to temporarily store a block of the image data having a specified data size;

an image processing device coupled to said image input circuit, said image processing device comprising:

an image data transfer component coupled to said input buffering circuitry for transferring the specifically-sized image data from said input image circuit;

a first ring buffer coupled to said image data transfer component to store the transferred image data block in:

plural, non-contiguously addressed areas of said first ring buffer when sequentially storing the transferred image data block exceeds a depth of said first ring buffer; and a sequential, contiguously addressed area of said first ring buffer when sequentially storing the transferred image data block fails to exceed the depth of said first ring buffer, a speed detection means coupled to said first ring buffer for determining a scanning speed based on the transferred image data, corresponding image data already contained in said first ring buffer, and the preselected sensor element spacing;

an image correction means coupled to said first ring buffer and speed detection means for performing image correction on the image data stored in said ring buffer, said image correction means including a distortion correction element that corrects distortions in the image data contained in said first ring buffer according to the scanning speed determined by said speed detection means; and a character recognizer, comprising:

a character extraction means coupled to said image correction means for extracting characters from corrected image data processed by said image processing device; and a character code generation means for converting the extracted characters in corresponding character codes; and a FIFO buffer connected between said image correction means and said character recognizer to store corrected image data processed by said image processing device.

27. The information input device of claim 26, wherein said FIFO buffer comprises a second ring buffer for memory-efficient storage and flexible transfer of the corrected image data to said character recognizer.

28. The information input device of claim 26, wherein said image input circuit comprises a manual-type scanning device.

29. The information input device of claim 26, wherein said image processing device and said character recognizer are controlled by a general purpose computer.

30. The information input device of claim 26, wherein said image processing device and said character recognizer are controlled by a dedicated, software-driven controller.

31. The information input device of claim 26, wherein said input buffering circuitry comprises:
- a plurality of input buffers switchably coupled in parallel to said image data generation means and said image processing device;
- a first buffer switching circuit coupled to said image data generation means and said input buffers for selectively driving each said input buffer, comprising:
  - a first selection means for selecting an empty input buffer upon receipt of image data generated by said image data generation area; and
  - a storing means coupled to said first selection means and said input buffers for storing the received image data in said selected empty input buffer until the specified data size has been reached, tagging said selected empty input buffer as full, deselecting said full input buffer, and notifying said first selection area to select another empty input buffer; and
- a second buffer switching circuit coupled to said first buffer switching circuit, said input buffers, and said image processing device, comprising:
  - a second selection means coupled to said first buffer switching circuit and said input buffers for selecting said full input buffer when said first buffer switching circuit selects another empty input buffer; and
  - a data downloading means coupled to said input buffers and said image processing device for downloading the image data block contained in said selected full buffer to said image processing device, tagging said selected full input buffer as empty when downloading operations are complete, and deselecting said selected empty input buffer.

32. The information input device of claim 26, wherein said image input circuit further comprises an image data transfer requestor interposing said image generation means and said image processing device to notify said image processing device when said image input circuit is ready to transfer the image data block; and
wherein said data transfer component is coupled to said image data transfer requester to monitor said image data transfer requestor and transfer the image data block held in said input buffering circuitry when notified by said data transfer requestor.

33. The information input device of claim 32, wherein said image data transfer requestor notifies said image processing device through a nonmaskable hardware interrupt;
wherein said image data transfer component of said image processing device only initiates transfer of the image data block held in said input buffering circuitry upon receipt of the nonmaskable hardware interrupt; and
wherein said image correction means performs correction operations only after said nonmaskable hardware interrupt is serviced and said first ring buffer has completed transfer of the image data block.

34. The information input device of claim 26, wherein said image correction device further comprises an character recognition notification requestor coupled to said character recognizer and said first ring buffer to notify said character recognizer when sized image data stored in said first ring buffer is ready to be corrected; and
wherein said character recognizer monitors said character recognition notification requestor and performs character recognition operations only after receiving image correction notification.

35. The information input device of claim 26, wherein said image data transfer requestor is also coupled to said character recognizer, and notifies said image processing device and character recognizer through a nonmaskable hardware interrupt;
wherein said image data transfer component of said image processing device only initiates transfer of the image data block held in said input buffering circuitry upon receipt of the nonmaskable hardware interrupt;
wherein said image correction means performs correction operations only after the nonmaskable hardware interrupt is serviced and said image data transfer component has completed transfer of the image data block;
wherein said image correction device further comprises a character recognition notification requestor coupled to said character recognizer and said second ring buffer to notify said character recognizer when sized image data stored in said second ring buffer is ready to be recognized; and
wherein said character recognizer monitors said character recognition notification requester and said image data transfer requestor, and performs character recognition operations only after receiving character recognition notification and in the absence of image data transfer request notification.

36. The information input device of claim 35, wherein said character recognition notification requestor comprises a watchdog timer for periodically notifying said character recognizer of pending image data contained in said first ring buffer via a timer interrupt having a lower priority than the nonmaskable hardware interrupt; and
wherein said character recognizer performs character extraction and recognition operations only after receiving the timer interrupt and in the absence of the nonmaskable hardware interrupt.

* * * * *

UNITED STATES PATENT AND TRADEMARK OFFICE
CERTIFICATE OF CORRECTION

PATENT NO. : 5,777,755
DATED : July 07, 1998
INVENTOR(S) : Mikio Aoki, et al.

It is certified that errors appear in the above identified patent and that said Letters Patent is hereby corrected as shown below:

Column 24, line 25, change "mean" to --means--.
    line 50, change "area" to --means-- in both occurrences.

Column 25, line 48, "area" to --means--.

Column 26, line 30, change "area" to --means--.

Column 28, line 8, change "iniput" to --input--.

Column 30, line 13, change "area" to --means--.

Column 31, line 12, change "area" to --means--.
    line 19, change "area" to --means--.

Signed and Sealed this

Fifth Day of January, 1999

Attest:

*Attesting Officer*     *Acting Commissioner of Patents and Trademarks*